US012785918B2

(12) United States Patent
Zhang et al.

(10) Patent No.: US 12,785,918 B2
(45) Date of Patent: Nov. 3, 2026

(54) TECHNIQUES FOR TRANSITIONING FROM FULL DUPLEX OPERATION TO HALF DUPLEX OPERATION

(71) Applicant: QUALCOMM Incorporated, San Diego, CA (US)

(72) Inventors: Qian Zhang, Basking Ridge, NJ (US); Yan Zhou, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 301 days.

(21) Appl. No.: 18/423,944

(22) Filed: Jan. 26, 2024

(65) Prior Publication Data

US 2025/0247201 A1 Jul. 31, 2025

(51) Int. Cl.
*H04L 5/16* (2006.01)
*H04W 88/06* (2009.01)

(52) U.S. Cl.
CPC ............... *H04L 5/16* (2013.01); *H04W 88/06* (2013.01)

(58) Field of Classification Search
CPC ................................ H04L 5/16; H04W 88/06
See application file for complete search history.

(56) References Cited

U.S. PATENT DOCUMENTS

2021/0176626 A1* 6/2021 Abdelghaffar ........ H04L 5/0091
2022/0183027 A1* 6/2022 Zhang .................. H04W 76/27
2022/0360422 A1 11/2022 Zhang et al.
2023/0422225 A1 12/2023 Zhang et al.

FOREIGN PATENT DOCUMENTS

WO WO-2023124800 A1 7/2023

OTHER PUBLICATIONS

International Search Report and Written Opinion—PCT/US2024/062278—ISA/EPO—Apr. 9, 2025.

* cited by examiner

*Primary Examiner* — Elton Williams
(74) *Attorney, Agent, or Firm* — Holland & Hart LLP

(57) ABSTRACT

Methods, systems, and devices for wireless communications are described. Techniques describe herein provide for transition from full-duplex (FD) operation to a half-duplex (HD) operation. A user equipment (UE) may transmit, to a network entity, control signaling indicating a capability to operate in a FD mode. The network entity may transmit, to the UE, control signaling indicating a network entity mode and a UE mode for communication of one or more messages. The network entity mode may be the FD mode or a HD mode, and the UE mode may be the FD mode or the HD mode. The UE 115 may communicate the one or more messages based on the indicated network entity mode and the indicated UE mode.

30 Claims, 19 Drawing Sheets

TECHNIQUES FOR TRANSITIONING FROM FULL DUPLEX OPERATION TO HALF DUPLEX OPERATION

FIELD OF TECHNOLOGY

The following relates to wireless communications, including techniques for transitioning from full-duplex operation to half-duplex operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for transitioning from a full duplex (FD) operation to a half-duplex (HD) operation. For example, the described techniques provide for a user equipment (UE) to transition from a FD mode to a HD mode. In some examples, the UE may transmit, to a network entity, control signaling indicating a capability to operate in the FD mode. The network entity may transmit, to the UE, control signaling indicating a network entity mode and a UE mode for communication of one or more messages. The network entity mode may be the FD mode or the HD mode, and the UE mode may be the FD mode or the HD mode. The UE 115 may communicate the one or more messages based on the indicated network entity mode and the indicated UE mode.

A method for wireless communication by a user equipment (UE) is described. The method may include transmitting, to a network entity, first control signaling indicating a capability to operate in a FD mode, receiving, from the network entity based on the first control signaling, second control signaling indicating a network entity mode and a UE mode for communication of one or more messages, where the network entity mode includes the FD mode or a HD mode and the UE mode includes the FD mode or the HD mode, and communicating the one or more messages based on the second control signaling indicating the network entity mode and the UE mode.

A UE for wireless communication is described. The UE may include one or more memories storing processor executable code, and one or more processors coupled with the one or more memories. The one or more processors may individually or collectively be operable to execute the code to cause the UE to transmit, to a network entity, first control signaling indicating a capability to operate in a FD mode, receive, from the network entity based on the first control signaling, second control signaling indicating a network entity mode and a UE mode for communication of one or more messages, where the network entity mode includes the FD mode or a HD mode and the UE mode includes the FD mode or the HD mode, and communicate the one or more messages based on the second control signaling indicating the network entity mode and the UE mode.

Another UE for wireless communication is described. The UE may include means for transmitting, to a network entity, first control signaling indicating a capability to operate in a FD mode, means for receiving, from the network entity based on the first control signaling, second control signaling indicating a network entity mode and a UE mode for communication of one or more messages, where the network entity mode includes the FD mode or a HD mode and the UE mode includes the FD mode or the HD mode, and means for communicating the one or more messages based on the second control signaling indicating the network entity mode and the UE mode.

A non-transitory computer-readable medium storing code for wireless communication is described. The code may include instructions executable by one or more processors to transmit, to a network entity, first control signaling indicating a capability to operate in a FD mode, receive, from the network entity based on the first control signaling, second control signaling indicating a network entity mode and a UE mode for communication of one or more messages, where the network entity mode includes the FD mode or a HD mode and the UE mode includes the FD mode or the HD mode, and communicate the one or more messages based on the second control signaling indicating the network entity mode and the UE mode.

Some examples of the method, user equipment (UEs), and non-transitory computer-readable medium described herein may further include operations, features, means, or instructions for receiving, from the network entity based on the second control signaling, third control signaling indicating a duration associated with the network entity mode, the UE mode, or both.

In some examples of the method, user equipment (UEs), and non-transitory computer-readable medium described herein, communicating the one or more messages may include operations, features, means, or instructions for communicating, based on a prioritized transmission direction, the one or more messages on an uplink channel or a downlink channel.

In some examples of the method, user equipment (UEs), and non-transitory computer-readable medium described herein, where the second control signaling indicates a change of the UE mode from the FD mode to the HD mode and the network entity mode is the FD mode, communicating the one or more messages may include operations, features, means, or instructions for communicating, based on prioritization of a channel type of a first channel or a reference signal type of the first channel, the one or more messages on the first channel or on a second channel.

In some examples of the method, user equipment (UEs), and non-transitory computer-readable medium described herein, where the second control signaling indicates a change of the UE mode from the FD mode to the HD mode and the network entity mode is the FD mode, communicating the one or more messages may include operations, features, means, or instructions for receiving, from the network entity, fourth control signaling indicating a priority associated with a first channel and communicating, based on the fourth control signaling, the one or more messages on the first channel or on a second channel.

Some examples of the method, user equipment (UEs), and non-transitory computer-readable medium described herein may further include operations, features, means, or instructions for receiving fourth control signaling that indicates a change of the UE mode from the FD mode to the HD mode and the network entity mode may be the FD mode and refraining from communicating one or more second messages based on the fourth control signaling.

In some examples of the method, user equipment (UEs), and non-transitory computer-readable medium described herein, where the second control signaling indicates a change of the network entity mode from the FD mode to the HD mode, a change of the UE mode from the FD mode to the HD mode, and a change of a FD slot to an uplink slot, where the one or more messages comprises an uplink message and a downlink message, communicating the one or more messages may include operations, features, means, or instructions for communicating the uplink message in the uplink slot and refraining from communicating the downlink message in the uplink slot.

In some examples of the method, user equipment (UEs), and non-transitory computer-readable medium described herein, where the second control signaling indicates a change of the network entity mode from the FD mode to the HD mode, a change of the UE mode from the FD mode to the HD mode, and a change of a FD slot to a downlink slot, where the one or more messages comprises an uplink message and a downlink message, communicating the one or more messages may include operations, features, means, or instructions for communicating the downlink message in the downlink slot and refraining from communicating the uplink message in the downlink slot.

In some examples of the method, user equipment (UEs), and non-transitory computer-readable medium described herein, where the second control signaling indicates a change of the UE mode from the FD mode to the HD mode, a change of the UE mode from the FD mode to the HD mode, and a change of a FD slot to a flexible slot, where the one or more messages comprise an uplink message and a downlink message, communicating the one or more messages may include operations, features, means, or instructions for communicating one of the uplink message or the downlink message in the flexible slot and refraining from communicating another of the uplink message or the downlink message in the flexible slot.

In some examples of the method, user equipment (UEs), and non-transitory computer-readable medium described herein, the second control signaling includes two or more bits and the two or more bits indicate the network entity mode and the UE mode.

In some examples of the method, user equipment (UEs), and non-transitory computer-readable medium described herein, the FD mode includes a sub-band FD mode, a partially overlapping FD mode, or a fully overlapping FD mode.

In some examples of the method, user equipment (UEs), and non-transitory computer-readable medium described herein, the second control signaling includes downlink control information, group common downlink control information, radio resource control signaling, or a medium access control control element.

A method for wireless communication by a network entity is described. The method may include obtaining, from a UE, first control signaling indicating a capability to operate in a FD mode, outputting, to the UE based on the first control signaling, second control signaling indicating a network entity mode and a UE mode for communication of one or more messages, where the network entity mode includes the FD mode or a HD mode and the UE mode includes the FD mode or the HD mode, and communicating the one or more messages based on the second control signaling indicating the network entity mode and the UE mode.

A network entity for wireless communication is described. The network entity may include one or more memories storing processor executable code, and one or more processors coupled with the one or more memories. The one or more processors may individually or collectively be operable to execute the code to cause the network entity to obtain, from a UE, first control signaling indicating a capability to operate in a FD mode, output, to the UE based on the first control signaling, second control signaling indicating a network entity mode and a UE mode for communication of one or more messages, where the network entity mode includes the FD mode or a HD mode and the UE mode includes the FD mode or the HD mode, and communicate the one or more messages based on the second control signaling indicating the network entity mode and the UE mode.

Another network entity for wireless communication is described. The network entity may include means for obtaining, from a UE, first control signaling indicating a capability to operate in a FD mode, means for outputting, to the UE based on the first control signaling, second control signaling indicating a network entity mode and a UE mode for communication of one or more messages, where the network entity mode includes the FD mode or a HD mode and the UE mode includes the FD mode or the HD mode, and means for communicating the one or more messages based on the second control signaling indicating the network entity mode and the UE mode.

A non-transitory computer-readable medium storing code for wireless communication is described. The code may include instructions executable by one or more processors to obtain, from a UE, first control signaling indicating a capability to operate in a FD mode, output, to the UE based on the first control signaling, second control signaling indicating a network entity mode and a UE mode for communication of one or more messages, where the network entity mode includes the FD mode or a HD mode and the UE mode includes the FD mode or the HD mode, and communicate the one or more messages based on the second control signaling indicating the network entity mode and the UE mode.

Some examples of the method, network entities, and non-transitory computer-readable medium described herein may further include operations, features, means, or instructions for outputting, to the UE based on the second control signaling, third control signaling indicating a duration associated with the network entity mode, and the UE mode, or both.

In some examples of the method, network entities, and non-transitory computer-readable medium described herein, where the second control signaling indicates a change of the UE mode from the FD mode to the HD mode and the network entity mode is the FD mode, communicating the one or more messages may include operations, features, means, or instructions for outputting, to the UE, fourth control signaling indicating a priority associated with a first channel and communicating, based on the fourth control signaling, the one or more messages on the first channel or a second channel.

In some examples of the method, network entities, and non-transitory computer-readable medium described herein, where the second control signaling indicates a change of the UE mode from the FD mode to the HD mode and the network entity mode is the FD mode, communicating the one or more messages may include operations, features, means, or instructions for outputting fourth control signaling that indicates a change of the UE mode from the FD mode to the HD mode and refraining from communicating one or more second messages based on the fourth control signaling.

In some examples of the method, network entities, and non-transitory computer-readable medium described herein, where the second control signaling indicates a change of the network entity mode from the FD mode to the HD mode, a change of the UE mode from the FD mode to the HD mode, and a change of a FD slot to an uplink slot, wherein the one or more messages comprises an uplink message and a downlink message, communicating the one or more messages may include operations, features, means, or instructions for communicating the uplink message in the uplink slot and refraining from communicating the downlink message in the uplink slot.

In some examples of the method, network entities, and non-transitory computer-readable medium described herein, where the second control signaling indicates a change of the network entity mode from the FD mode to the HD mode, a change of the UE mode from the FD mode to the HD mode, and a change of a FD slot to a downlink slot, where the one or more messages comprises an uplink message and a downlink message, communicating the one or more messages may include operations, features, means, or instructions for communicating the downlink message in the downlink slot and refraining from communicating the uplink message in the downlink slot.

In some examples of the method, network entities, and non-transitory computer-readable medium described herein, where the second control signaling indicates a change of the UE mode from the FD mode to the HD mode, a change of the UE mode from the FD mode to the HD mode, and a change of a FD slot to a flexible slot, where the one or more messages comprise an uplink message and a downlink message, communicating the one or more messages may include operations, features, means, or instructions for communicating the uplink message in the flexible slot and refraining from communicating another uplink message or the downlink message in the flexible slot.

In some examples of the method, network entities, and non-transitory computer-readable medium described herein, the second control signaling includes two or more bits and the two or more bits indicate the network entity mode and the UE mode.

A method for wireless communication by a UE is described. The method may include transmitting, to a network entity, first control signaling indicating a capability to switch from a first bandwidth filter operation to a second bandwidth filter operation, from the second bandwidth filter operation to the first bandwidth filter operation, or both, where first bandwidth filter operation is associated a first bandwidth that is wider than a second bandwidth associated with the second bandwidth filter operation, receiving, from the network entity based on the first control signaling, second control signaling switching a FD symbol to a HD symbol or the HD symbol to the FD symbol, and communicating, with the network entity based on the second control signaling, a message in the HD symbol or the FD symbol by applying the first bandwidth filter operation or the second bandwidth filter operation.

A UE for wireless communication is described. The UE may include one or more memories storing processor executable code, and one or more processors coupled with the one or more memories. The one or more processors may individually or collectively be operable to execute the code to cause the UE to transmit, to a network entity, first control signaling indicating a capability to switch from a first bandwidth filter operation to a second bandwidth filter operation, from the second bandwidth filter operation to the first bandwidth filter operation, or both, where first bandwidth filter operation is associated a first bandwidth that is wider than a second bandwidth associated with the second bandwidth filter operation, receive, from the network entity based on the first control signaling, second control signaling switching a FD symbol to a HD symbol or the HD symbol to the FD symbol, and communicate, with the network entity based on the second control signaling, a message in the HD symbol or the FD symbol by applying the first bandwidth filter operation or the second bandwidth filter operation.

Another UE for wireless communication is described. The UE may include means for transmitting, to a network entity, first control signaling indicating a capability to switch from a first bandwidth filter operation to a second bandwidth filter operation, from the second bandwidth filter operation to the first bandwidth filter operation, or both, where first bandwidth filter operation is associated a first bandwidth that is wider than a second bandwidth associated with the second bandwidth filter operation, means for receiving, from the network entity based on the first control signaling, second control signaling switching a FD symbol to a HD symbol or the HD symbol to the FD symbol, and means for communicating, with the network entity based on the second control signaling, a message in the HD symbol or the FD symbol by applying the first bandwidth filter operation or the second bandwidth filter operation.

A non-transitory computer-readable medium storing code for wireless communication is described. The code may include instructions executable by one or more processors to transmit, to a network entity, first control signaling indicating a capability to switch from a first bandwidth filter operation to a second bandwidth filter operation, from the second bandwidth filter operation to the first bandwidth filter operation, or both, where first bandwidth filter operation is associated a first bandwidth that is wider than a second bandwidth associated with the second bandwidth filter operation, receive, from the network entity based on the first control signaling, second control signaling switching a FD symbol to a HD symbol or the HD symbol to the FD symbol, and communicate, with the network entity based on the second control signaling, a message in the HD symbol or the FD symbol by applying the first bandwidth filter operation or the second bandwidth filter operation.

In some examples of the method, user equipment (UEs), and non-transitory computer-readable medium described herein, the first bandwidth filter operation includes a wideband filter operation.

In some examples of the method, user equipment (UEs), and non-transitory computer-readable medium described herein, the second bandwidth filter operation includes a narrow band filter operation or a subband filter operation.

In some examples of the method, user equipment (UEs), and non-transitory computer-readable medium described herein, where the second control signaling indicates a change of the FD symbol to the HD symbol, communicating the messages may include operations, features, means, or instructions for communicating the message in the HD symbol by applying the first bandwidth filter operation.

In some examples of the method, user equipment (UEs), and non-transitory computer-readable medium described herein, the FD symbol includes a subband FD symbol configured on a flexible symbol or the subband FD symbol configured on a downlink symbol.

In some examples of the method, user equipment (UEs), and non-transitory computer-readable medium described herein, the HD symbol includes an uplink symbol or a downlink symbol.

A method for wireless communication by a network entity is described. The method may include obtaining, from a UE, first control signaling indicating a capability to switch from a first bandwidth filter operation to a second bandwidth filter operation, from the second bandwidth filter operation to the first bandwidth filter operation, or both, where the first bandwidth filter operation is associated a first bandwidth that is wider than a second bandwidth associated with the second bandwidth filter operation, outputting, to the UE based on the first control signaling, second control signaling switching a FD symbol to HD symbol or the HD symbol to the FD symbol, and communicating, with the UE based on the second control signaling, a message in the FD symbol or the HD symbol.

A network entity for wireless communication is described. The network entity may include one or more memories storing processor executable code, and one or more processors coupled with the one or more memories. The one or more processors may individually or collectively be operable to execute the code to cause the network entity to obtain, from a UE, first control signaling indicating a capability to switch from a first bandwidth filter operation to a second bandwidth filter operation, from the second bandwidth filter operation to the first bandwidth filter operation, or both, where the first bandwidth filter operation is associated a first bandwidth that is wider than a second bandwidth associated with the second bandwidth filter operation, output, to the UE based on the first control signaling, second control signaling switching a FD symbol to HD symbol or the HD symbol to the FD symbol, and communicate, with the UE based on the second control signaling, a message in the FD symbol or the HD symbol.

Another network entity for wireless communication is described. The network entity may include means for obtaining, from a UE, first control signaling indicating a capability to switch from a first bandwidth filter operation to a second bandwidth filter operation, from the second bandwidth filter operation to the first bandwidth filter operation, or both, where the first bandwidth filter operation is associated a first bandwidth that is wider than a second bandwidth associated with the second bandwidth filter operation, means for outputting, to the UE based on the first control signaling, second control signaling switching a FD symbol to HD symbol or the HD symbol to the FD symbol, and means for communicating, with the UE based on the second control signaling, a message in the FD symbol or the HD symbol.

A non-transitory computer-readable medium storing code for wireless communication is described. The code may include instructions executable by one or more processors to obtain, from a UE, first control signaling indicating a capability to switch from a first bandwidth filter operation to a second bandwidth filter operation, from the second bandwidth filter operation to the first bandwidth filter operation, or both, where the first bandwidth filter operation is associated a first bandwidth that is wider than a second bandwidth associated with the second bandwidth filter operation, output, to the UE based on the first control signaling, second control signaling switching a FD symbol to HD symbol or the HD symbol to the FD symbol, and communicate, with the UE based on the second control signaling, a message in the FD symbol or the HD symbol.

In some examples of the method, network entities, and non-transitory computer-readable medium described herein, the first bandwidth filter operation includes a wideband filter operation and the second bandwidth filter operation includes a narrow band filter operation or a subband filter operation.

In some examples of the method, network entities, and non-transitory computer-readable medium described herein, communicating the message may include operations, features, means, or instructions, where the second control signaling indicates a change of the FD symbol to the HD symbol, communicating the message in the HD symbol by applying the first bandwidth filter operation.

In some examples of the method, network entities, and non-transitory computer-readable medium described herein, the FD symbol includes a subband FD symbol configured on a flexible symbol or the subband FD symbol configured on a downlink symbol and the HD symbol includes an uplink symbol or a downlink symbol.

DETAILED DESCRIPTION

Figure 1:
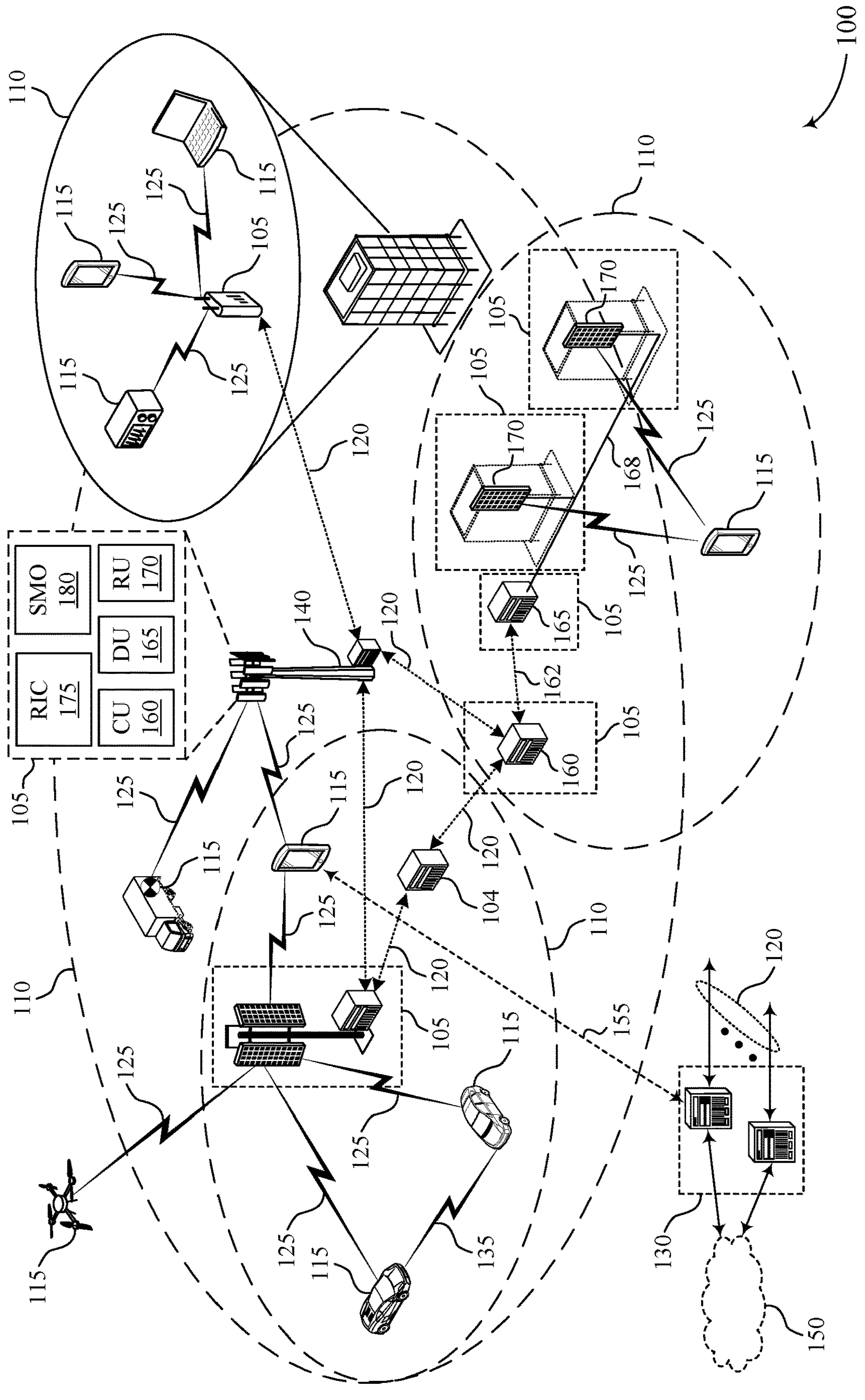
FIG. 1 shows an example of a wireless communications system that supports techniques for transitioning from full-duplex (FD) operation to half-duplex (HD) operation in accordance with one or more aspects of the present disclosure.

Some wireless communication systems may include a network entity and a user equipment (UE). In some examples, the network entity may operate in a full-duplex (FD) mode or a half-duplex (HD) mode, and the UE may operate in the FD mode or the HD mode. When both the network entity and UE operate in the FD mode, the network entity may configure the UE to simultaneously transmit in an uplink subband and receive in a downlink subband in a FD symbol or slot. In some cases, the network entity may operate in the FD mode or the HD mode based on different conditions or use cases. Additionally, the network entity may configure the UE in the FD mode or the HD mode in symbols or slots based on different conditions or different use cases. For example, if self-interference at the UE in the FD mode is high, the UE may request that the network entity switch the UE from the FD mode to the HD mode. The network entity may also configure the FD mode or the HD mode based on downlink and traffic demand. When the UE is transitioned from one mode to the other mode or the network entity is transitioned from one mode to the other mode, the UE may have to modify an antenna configuration, a RF tuning and other operational parameters. Currently, there is no procedure for indicating the transition from one mode to another mode.

Techniques for transitioning from the FD mode to the HD mode may improve the communication system operation. In some examples, the UE may transmit, to the network entity, control signaling indicating a capability to operate in a FD mode. The network entity may transmit, to the UE, control signaling indicating a network entity mode and a UE mode for communication of one or more messages. The network entity mode may be the FD mode or a HD mode, and the UE mode may be the FD mode or the HD mode. The UE may communicate the one or more messages based on the indicated network entity mode and the indicated UE mode. In some cases, the UE may receive, from the network entity, control signaling indicating a duration associated with the network entity mode, the UE mode, or both. In some examples, UE may transmit, to the network entity, control signaling indicating a capability to switch from a wideband filter operation to a narrow band filter operation, from the narrow band filter operation to the wideband filter operation, or both. The wideband filter operation may be associated a bandwidth that is wider than a bandwidth associated with the narrow band filter operation. The UE may receive, from the network entity, control signaling switching a FD symbol to a HD symbol or the HD symbol to the FD symbol. The UE may communicate a message in the HD symbol or the FD symbol by applying the narrow band filter operation or the wideband filter operation. The first bandwidth filter operation may be a wideband filter operation, and the second bandwidth filter operation may be a narrow band filter operation or a subband filter operation.

Aspects of the disclosure are initially described in the context of wireless communications systems. Aspects of the disclosure are also described in context of a SBFD pattern, HD and SBFD patterns and process flows. Aspects of the disclosure are further illustrated by and described with reference to apparatus diagrams, system diagrams, and flowcharts that relate to techniques for transition from SBFD operation to HD operation.

FIG. 1 shows an example of a wireless communications system 100 that supports techniques for transitioning from FD operation to HD operation in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some wireless communication systems may include the network entity 105 and the UE 115. In some examples, the network entity may operate in a FD mode or a HD mode, and the UE 115 may operate in the FD mode or the HD mode. When both the network entity 105 and UE 115 operate in the FD mode, the network entity 105 may configure the UE 115 to simultaneously transmit in an uplink subband and receive in a downlink subband in a FD symbol or slot. In some cases, the network entity 105 may operate in the FD mode or the HD mode based on different conditions or use cases. Additionally, the network entity 105 may configure the UE 115 in the FD mode or the HD mode in symbols or slots based on different conditions or different use cases. For example, if self-interference at the UE 115 in the FD mode is high, the UE 115 may request that the network entity 105 switch the UE from the FD mode to the HD mode. The network entity 105 may also configure the FD mode or the HD mode based on downlink and traffic demand. When the UE 115 is transitioned from one mode to the other mode or the network entity 105 is transitioned from one mode to the other mode, the UE 115 may have to modify an antenna configuration, a RF tuning and other operational parameters. Currently, there is no procedure for indicating the transition from one mode to another mode.

Techniques for transitioning from the FD mode to the HD mode may improve the communication system operation. In some examples, the UE 115 may transmit, to the network entity 105, control signaling indicating a capability to operate in a FD mode. The network entity 105 may transmit, to the UE 115, control signaling indicating a network entity mode and a UE mode for communication of one or more messages. The network entity mode may be the FD mode or a HD mode, and the UE mode may be the FD mode or the HD mode. The UE 115 may communicate the one or more messages based on the indicated network entity mode and the indicated UE mode. In some cases, the UE 115 may receive, from the network entity 105, control signaling indicating a duration associated with the network entity mode, the UE mode, or both. In some examples, UE 115 may transmit, to the network entity 105, control signaling indicating a capability to switch from a wideband filter operation to a narrow band filter operation, from the narrow band filter operation to the wideband filter operation, or both. The wideband filter operation may be associated a bandwidth that is wider than a bandwidth associated with the narrow band filter operation. The UE 115 may receive, from the network entity 105, control signaling switching a FD symbol to a HD symbol or the HD symbol to the FD symbol. The UE 115 may communicate a message in the HD symbol or the FD symbol by applying the narrow band filter operation or the wideband filter operation. The first bandwidth filter operation may be a wideband filter operation, and the second bandwidth filter operation may be a narrow band filter operation or a subband filter operation.

Figure 2:
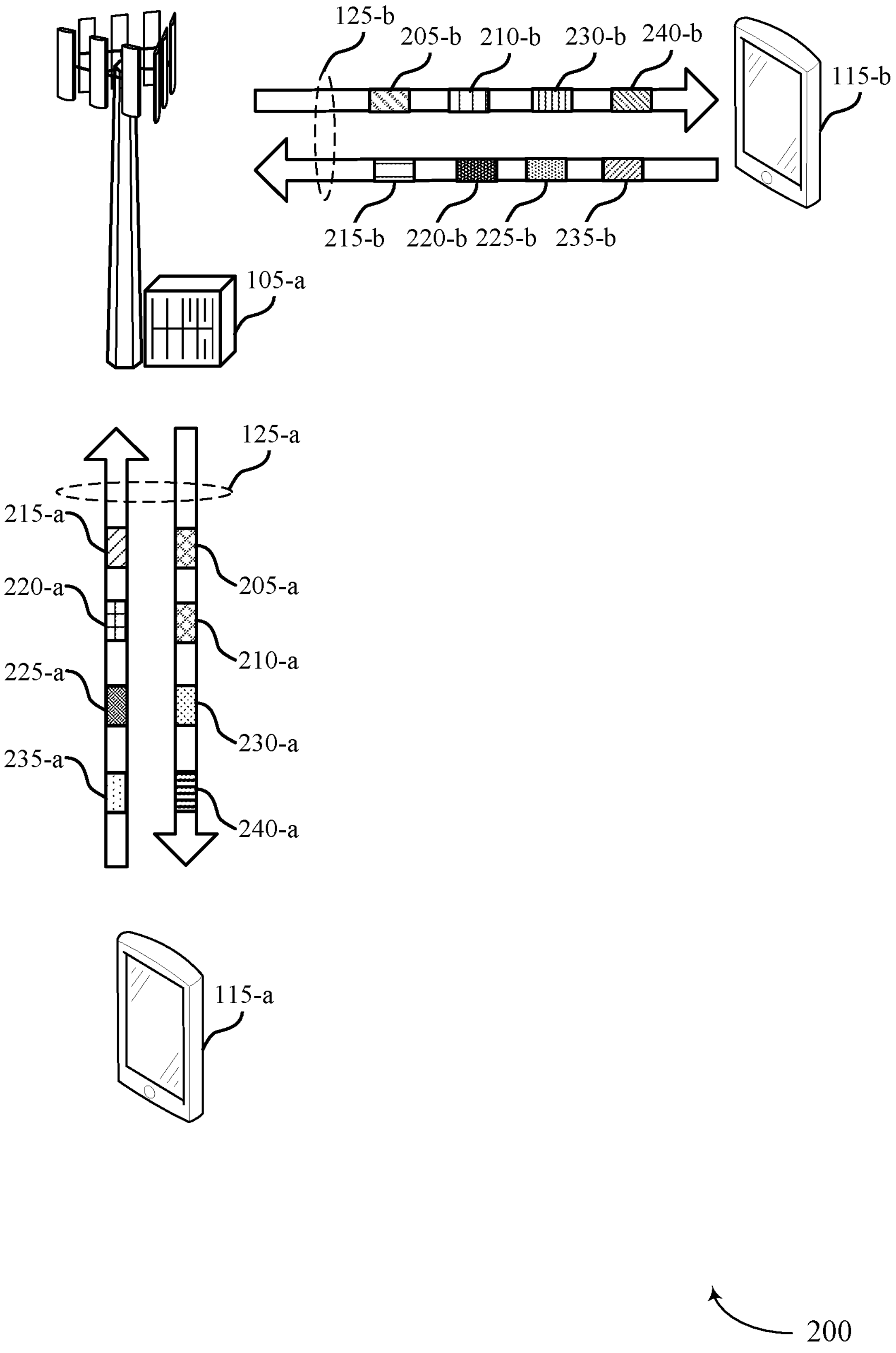
FIG. 2 shows an example of a wireless communications system that supports techniques for transitioning from FD operation to HD operation in accordance with one or more aspects of the present disclosure.

FIG. 2 shows an example of a wireless communications system 200 that supports techniques for transitioning from FD operation to HD operation in accordance with one or more aspects of the present disclosure. The wireless communications system 200 may implement aspects of or may be implemented by aspects of the wireless communications system 100. For example, the wireless communications system 200 includes a UE 115-*a* and a UE 115-*b*, which may be an example of a UE 115 as described herein. The wireless communications system 200 may also include a network entity 105-*a*, which may be an example of a network entity 105 as described herein.

The UE 115-*a* may communicate with the network entity 105-*a* using a communication link 125-*a*. The communication link 125-*a* may be an example of an NR or LTE link (among other examples) between the UE 115-*a* and the network entity 105-*a*. The communication link 125-*a* may include bi-directional links that enable both uplink and downlink communications. For example, the network entity 105-*a* may transmit downlink signals (e.g., downlink transmissions), such as downlink control signaling 205-*a* and downlink data signals 210-*a*, to the UE 115-*a* using the communication link 125-*a*, and the UE 115-*a* may transmit uplink signals (e.g., uplink transmissions), such as uplink control signaling 215-*a* and uplink data signals 220-*a*, to the network entity 105-*a* using the communication link 125-*a*.

The UE 115-*b* may communicate with the network entity 105-*a* using a communication link 125-*b*. The communication link 125-*b* may be an example of an NR or LTE link (among other examples) between the UE 115-*b* and the network entity 105-*a*. The communication link 125-*b* may include bi-directional links that enable both uplink and downlink communications. For example, the network entity 105-*b* may transmit downlink signals (e.g., downlink transmissions), such as downlink control signaling 205-*b* and downlink data signals 210-*b*, to the UE 115-*b* using the communication link 125-*b*, and the UE 115-*b* may transmit uplink signals (e.g., uplink transmissions), such as uplink control signaling 215-*b* and uplink data signals 220-*b*, to the network entity 105-*a* using the communication link 125-*b*.

Figure 3:
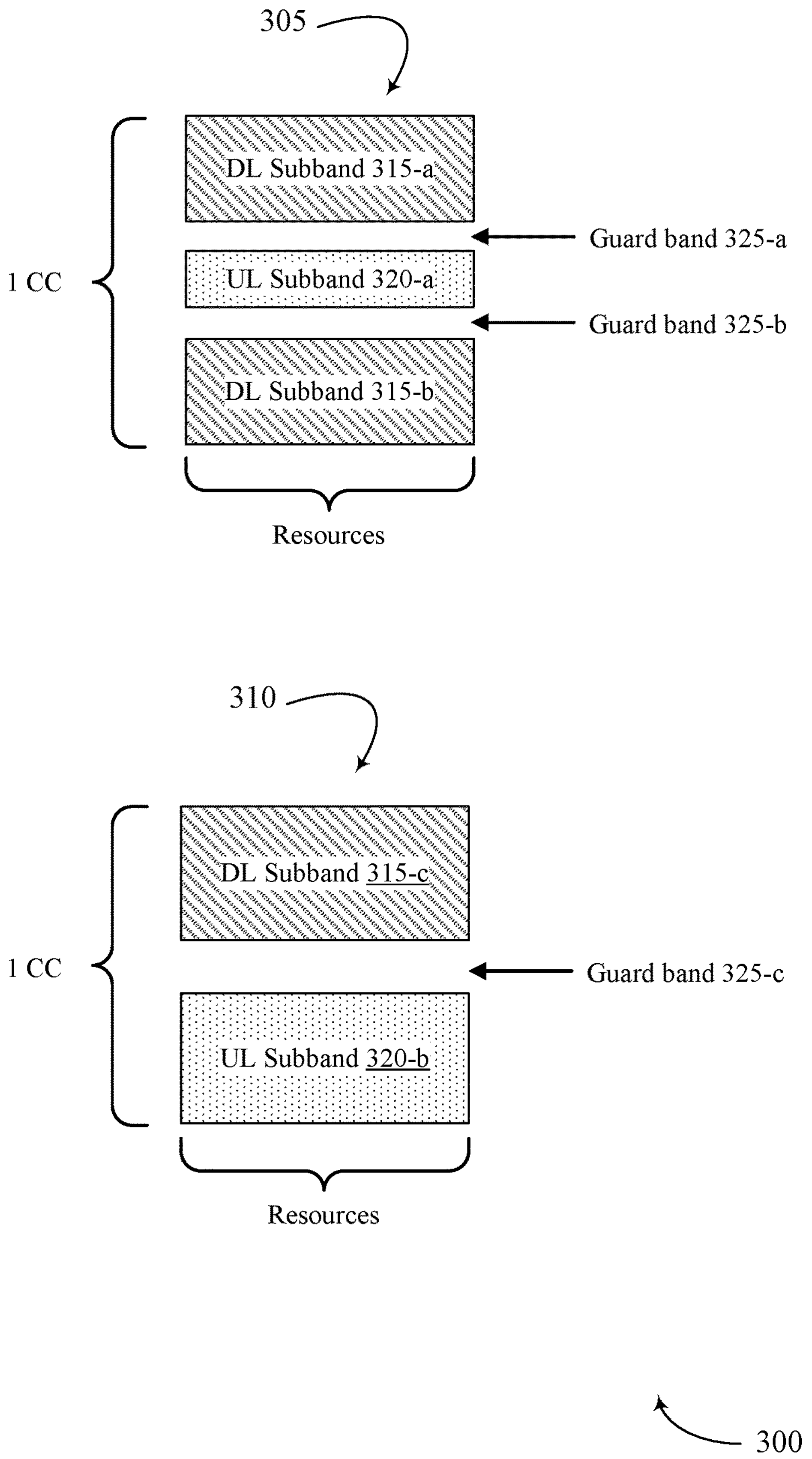
FIG. 3 shows an example of a subband full-duplex (SBFD) pattern that supports techniques for transitioning from FD operation to HD operation in accordance with one or more aspects of the present disclosure.

FIG. 3 shows an example of a subband full-duplex (SBFD) pattern 300 that supports techniques for transitioning from FD operation to HD operation in accordance with one or more aspects of the present disclosure. Aspects of the SBFD pattern 300 may implement, or be implemented by, aspects of wireless communications system 100 and the wireless communications system 200, or any combination thereof.

In some examples, the SBFD pattern 300 may be a downlink subband+uplink subband+downlink subband (D+U+D) pattern 305 or a downlink subband+uplink (D+U) pattern 310. The D+U+D pattern 305 may include a downlink subband 315-*a*, an uplink subband 320-*a*, and a downlink subband 315-*b*. A guard band 325-*a* may be introduced between the downlink subband 315-*a* and the uplink subband 320-*a*, and a guard band 325-*b* may be introduced between the uplink subband 320-*a* and the downlink subband 315-*b*. The D+U pattern 310 may include a downlink subband 315-*c* and an uplink subband 320-*b*. A guard band 325-*c* may be introduced between the downlink subband 315-*c* and the uplink subband 320-*b*. The guard band (e.g., guard band 325-*a*, guard band 325-*b*, guard band 325-*c*) may include a quantity of resource blocks. The D+U+D pattern 305 and D+U pattern 310 may occupy time resources of a symbol, a slot, or other time resource; the D+U+D pattern 305 and D+U pattern 310 may occupy frequency resources of a component carrier, a bandwidth, or other frequency resource.

In some examples, the network entity 105-*a* may operate in a FD mode, such as a SBFD mode, to simultaneously serve a downlink UE (e.g., UE 115-*a*) and an uplink UE (e.g., UE 115-*b*) on corresponding subbands. For example, the network entity 105-*a* may serve the UE 115-*a* on corresponding downlink subbands (e.g., downlink subband 315-*a* and downlink subband 315-*b* of the D+U+D pattern 305 and downlink subband 315-*c* of the D+U pattern 310), and the network entity 105-*a* may serve the UE 115-*b* on corresponding uplink subbands (e.g., uplink subband 320-*a* of the D+U+D pattern 305 and uplink subband 320-*b* of the D+U pattern 310). The SBFD mode of the network entity 105-*a* in a TDD carrier or for intra-band carrier aggregation (CA) may allow the simultaneous transmission and reception of downlink signals and uplink signals on a subband basis. The increase uplink duty cycle may lead to latency reduction. For example, transmitting the uplink signal in uplink subband in legacy downlink or flexible slots or receiving downlink signal in downlink subband(s) in legacy uplink slots may enable latency savings. In some cases, the SBFD mode may improve uplink coverage, enhance system capacity, resource utilization and spectrum efficiency. In some examples, the SBFD mode may enable flexible and dynamic uplink or downlink resource adaption according to uplink or downlink traffic in a robust manner. A full duplex (FD) mode may allow simultaneous transmission and reception of downlink signals and uplink signals on the same slot.

In some examples, the network entity 105-*a* may operate in a network entity mode of the SBFD mode or the HD mode, and the UE (e.g., UE 115-*a* and UE 115-*b*) may operate in the SBFD mode or the HD mode. The SDFD mode operation may be generalized to a partially or fully overlapping FD mode operation. For the discussion herein, the SBFD mode will be used in the examples provided and the FD mode may also be applied to the examples discussed herein. In some examples, the network entity 105-*a* may operate in the HD mode and the UE 115-*a* may operate in the HD mode (e.g., mode 1), and the UE 115-*a* may communicate via an uplink or downlink beam with a HD cell of the network entity 105-*a*. In some examples, the network entity 105-*a* may operate in the SBFD mode and the UE 115-*a* and UE 115-*b* may operate in the HD mode (e.g., mode 2), and the UE 115-*a* may communicate via a downlink beam and the UE 115-*b* may communicate with an uplink beam with a SBFD cell of the network entity 105-*a*. In some examples, the network entity 105-*a* may operate in the SBFD mode and the UE 115-*a* may operate in the SBFD mode (e.g., mode 3), and the UE 115-*a* may communicate via an uplink beam and a downlink beam with a SBFD cell of the network entity 105-*a*. In some examples, the network entity 105-*a* may operate in the FD mode and the UE 115-*a* may operate in the SBFD mode (e.g., mode 4), and the UE 115-*a* may communicate via an uplink beam with a first HD TRP (or low capacity HD cell) and via a downlink beam with a second HD TRP (or low capacity HD cell) of the network entity 105-*a*. From the UE perspective, mode 3 and mode 4 may be treated the same, and the two modes may be transparent to the SBFD capable UE (e.g., UE 115-*a*, UE 115-*b*) if the two TRPS or cells are under the same cell or DU. The UE (e.g., UE 115-*a*, UE 115-*b*) SBFD operation may be generalized to a partial or fully overlapping UE FD operation.

In some cases, the HD mode and SBFD mode for the UE (e.g., UE 115-*a* and UE 115-*b*) may coexist with some symbols or slots being semi-statically configured as SBFD symbols or slots on legacy downlink or legacy flexible symbols and other symbols or slots may be configured as legacy HD symbols or slots. For example, one or multiple modes (e.g., mode 1, mode 2, mode 3, and mode 4) may be configured in different symbols or slots, or one or multiple modes may switch from one mode to another mode at a time or condition.

Figure 4:
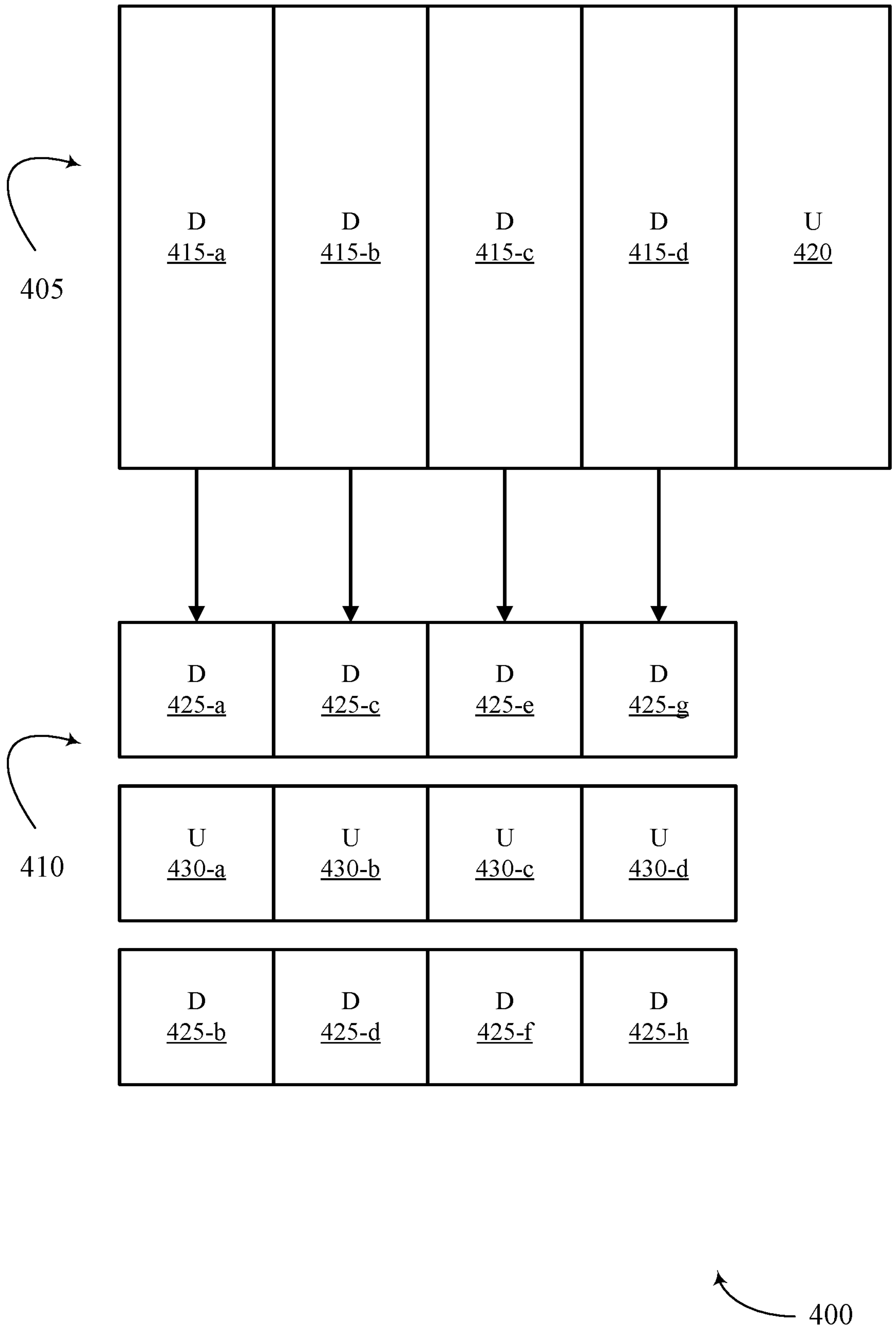
FIG. 4 shows an example of a HD and SBFD pattern that supports techniques for transitioning from FD operation to HD operation in accordance with one or more aspects of the present disclosure.

FIG. 4 shows an example of a HD and SBFD pattern 400 that supports techniques for transitioning from FD operation to HD operation in accordance with one or more aspects of the present disclosure. Aspects of the HD and SBFD pattern 400 may implement, or be implemented by, aspects of wireless communications system 100 and the wireless communications system 200, or any combination thereof.

In some examples, the HD and SBFD pattern 400 may include a HD pattern 405 and a SBFD pattern 410. The HD pattern 405 may include a downlink symbol 415-*a*, a downlink symbol 415-*b*, a downlink symbol 415-*c*, a downlink symbol 415-*d*, and an uplink symbol 420. The SBFD pattern may include a downlink subband 425-*a*, an uplink subband 430-*a*, a downlink subband 425-*b*, a downlink subband 425-*c*, an uplink subband 430-*b*, a downlink subband 425-*d*, a downlink subband 425-*e*, an uplink subband 430-*c*, a downlink subband 425-*f*, a downlink subband 425-*g*, an uplink subband 430-*d*, and a downlink subband 425-*h*. In some examples, the SBFD symbols may be configured on the downlink symbols or the SBFD symbols may be configured on flexible symbols. The HD pattern 405 and SBFD pattern 410 may occupy frequency resources of a component carrier, a bandwidth, or other frequency resource.

In some examples, for a SBFD aware UE (e.g., UE 115-*a* and UE 115-*b*) semi-statically configured with an uplink subband in a SBFD symbol that was configured as downlink in TDD-UL-DL-ConfigCommon, uplink transmissions within the uplink subband may be allowed in the symbol and uplink transmission outside the uplink subband may not be allowed in the symbol. In some cases, the frequency locations of the downlink subband(s) may be known to the SBFD aware UE, and the frequency location of the downlink subband(s) may be explicitly indicated or implicitly derived. Downlink receptions within the downlink subband(s) may be allowed within the symbol. Uplink transmission may be within active uplink BWP and downlink receptions may be within active downlink BWP in the symbol.

In some examples, for SBFD operation in a symbol that was configured as flexible in TDD-UL-DL-ConfigCommon, the SBFD aware UE (e.g., UE 115-*a* and UE 115-*b*) may be allowed to communicate uplink transmissions within the uplink subband in the symbol and may not be allowed to communicate uplink transmission outside the uplink subband in the symbol. In some cases, the frequency locations of the downlink subband(s) may be known to the SBFD aware UE. Downlink receptions within the downlink subband(s) may be allowed in the symbol. Uplink transmission may be within active uplink BWP and downlink receptions may be within active downlink BWP in the symbol.

In some examples, for SBFD operation in a symbol that was configured as flexible in TDD-UL-DL-ConfigCommon, the SBFD aware UE (e.g., UE 115-*a* and UE 115-*b*) may be allowed to communicate uplink transmissions within the uplink subband in the symbol. Resource blocks outside the uplink subband may be used as either uplink or downlink excluding guard bands in the symbol from the perspective of the network entity 105-*a*, and the transmission direction for the resources blocks may be the same. In some cases, the frequency locations of the downlink subband(s) may be known to the SBFD aware UE. Downlink receptions within the downlink subband(s) may be allowed in the symbol. Uplink transmission may be within active uplink BWP and downlink receptions may be within active downlink BWP in the symbols. For all resource blocks outside the uplink subband, the UE (e.g., UE 115-*a* and UE 115-*b*) may not use separate resource blocks for downlink and uplink simultaneously.

In some cases, a SBFD capable UE (e.g., UE 115-*a* and UE 115-*b*) may be capable of being configured for simultaneous transmission in the uplink subband and for reception in the downlink subband in a SBFD symbol or slot. In some examples, the SBFD network entity may not configure the SBFD capable UE on all symbols or slots during all the time. The scheduling decision may depend on different conditions. In some examples, the SBFD capability of the UE may be conditional or dynamic. For example, if self-interference at the UE becomes very high (e.g., due to a clutter), the UE (e.g., UE 115-*a* and UE 115-*b*) operating in the SBFD mode may request and indicate to network entity 105-*a* to switch to a UE HD mode (e.g., the network entity 105-*a* may stay in the SBFD mode). In another example, the network entity may configure the SBFD mode or the HD mode based on traffic demand per downlink or uplink. For example, the UE 115-*a* may have a configured grant with a larger periodicity that a semi-persistent scheduled traffic. Partial occasions of the semi-persistent scheduled traffic of the UE 115-*a* may pair with the configured grant of the UE 115-*a* for the SBFD operation, and other partial occasions of the semi-persistent scheduled traffic of the UE 115-*a* may pair with a configured grant of the UE 115-*b* in the SBFD mode while the UE 115-*a* may operate in the HD mode. In some cases, the UE 115-*a* may have dominant traffic in one direction, and the network entity 105-*a* may pair the UE 115-*a* and the UE 115-*b* for SBFD operation. In some examples, the UE 115-*a* may have urgent traffic to transmit, and the network entity 105-*a* may pair the UE 115-*b* with the UE 115-*a* for SBFD operation by the network entity with the UE 115-*a* and UE 115-*b* in HD mode.

In some examples, the network entity 105-*a* may indicate to the UE 115-*a* the network entity mode and the UE mode. For example, the network entity 105-*a* may indicate the network entity mode as the SBFD mode (or FD mode) and the UE mode as the HD mode or the network entity mode as the SBFD mode (or FD mode) and the UE mode as the SBFD mode (or FD mode). When the UE 115-*a* is transitioned from SBFD mode to HD mode, the UE may have to modify an antenna configuration. For example, the UE 115-*a* may use a full antenna array for the HD mode, and the UE 115-*a* may split the full antenna array into two separate arrays or panels for the SBFD mode. When the UE 115-*a* is transitioned from HD mode to the SBFD mode, the network entity 105 may configure the UE 115-*a* with two transmission configuration indication (TCI) states for a paired DL and UL transmissions considering self-interference conditions, which may be different from a best reference signal received quality (RSRP) TCI state of the HD mode. In some occasions, the operation parameters of uplink transmission power, modulation and coding scheme (MCS), and downlink or uplink beam configuration may be different for the SBFD mode and the HD mode. In some cases, the RF may retune for the transition from one mode to another mode (e.g., an additional UE filter may be used for the SBFD mode for self-interference mitigation). In some cases, the UE 115-*a* in the SBFD mode may have a different subband, frequency pattern, guard band compared with network entity 105-*a* in the SBFD mode, and a switching delay may be implemented.

In some examples, the network entity 105-*a* may indicate to the UE 115-*a* and UE 115-*b* the network entity mode and the UE mode for communication of one or more messages. In some cases, the UE 115-*a* may transmit, to the network entity 105-*a*, control signaling 225-*a* indicating a capability to operate in a SBFD mode (or FD mode). In some cases, the UE 115-*b* may transmit, to the network entity 105-*a*, control signaling 225-*b* indicating a capability to operate in a SBFD mode (or FD mode).

In some examples, the network entity 105-*a* may transmit, to the UE 115-*a*, control signaling 230-*a* indicating a network entity mode and a UE mode for communication of one or more messages (e.g., message 235-*a* or message 240-*a*). In some cases, the network entity 105-*a* may transmit, to the UE 115-*b*, control signaling 230-*b* indicating a network entity mode and a UE mode for communication of one or more messages (e.g., message 235-*b* or message 240-*b*). In some examples, the control signaling 230-*a* and control signaling 230-*b* may indicate to a SBFD capable UE whether to operate in UE HD or FD mode. In some examples, the control signaling 230-*a* and control signaling 230-*b* may be one or two bits in downlink control information (DCI) or group common DCI, RRC signaling with a "duplex mode" field, or one or two bits in a MAC control element (CE). In some examples, the control signaling 230-*a* and control signaling 230-*b* may provide a baseline network entity mode and UE mode by a semi-static indication by RRC signaling. In some examples, the control signaling 230-*a* and control signaling 230-*b* may provide a dynamic fallback SBFD signaling with per duration, per period, per window, or per slot still pending. For example, UE 115-*a* may receive, from the network entity 105-*a*, control signaling indicating a duration associated with the network entity mode, the UE mode, or both. In some cases, the FD mode may be the SBFD mode, a partially overlapping FD mode, or a fully overlapping FD mode.

In some examples, the UE 115-*a* may receive dynamic indication of the network entity mode and the UE mode as the UE SBFD mode and the network entity SBFD mode or the UE HD mode and network entity SBFD mode. The dynamic indication may be provided to a single UE (e.g., UE 115-*a* or UE 115-*b*) or to a group of UEs (e.g., UE 115-*a* and UE 115-*b*). In some cases, the UE 115-*a* and UE 115-*b* may share the same beam pair with high self-interference.

In some cases, the UE 115-*a* (or UE 115-*b*) may transition from the FD mode to the HD mode based on the indicated change from the UE SBFD mode to the UE HD mode (e.g., fallback operation from FD mode to HD mode) when the UE 115-*a* is higher layer configured with a downlink channel, an uplink channel or reference signal(s). For example, when the control signaling 230-*a* indicates a change of the UE mode from the SBFD mode to the HD mode and the network entity mode is the SBFD mode, the UE 115-*a* may communicate, based on a prioritized transmission direction, the messages (e.g., message 235-*a* or message 240-*a*) on an uplink channel or a downlink channel, the prioritize direction may be based on a specification rule, such as prioritize the uplink channel (e.g., prioritize one direction).

In some examples, when the control signaling 230-*a* indicates a change of the UE mode from the SBFD mode to the HD mode and the network entity mode is the SBFD mode, the UE 115-*a* may communicate the message (e.g., message 235-*a* or message 240-*a*) based on a channel type or a reference signal type. For example, at least some channel types may be prioritized and at least some reference signal types may be prioritized, such as if UE 115-*a* is configured with semi-persistent scheduling and a random access (RO), the RO may be prioritized.

In some examples, when the control signaling 230-*a* indicates a change of the UE mode from the SBFD mode to the HD mode and the network entity mode is the SBFD mode, the UE 115-*a* may receive, from the network entity 105-*a*, an indication of a priority associated with a channel, a channel type, or a reference signal type, and the UE 115-*a* may communicate the message (e.g., message 235-*a* or message 240-*a*) based on the indicated priority. For example, the network entity 105-*a* may transmit, to the UE 115-*a*, control signaling indicating the priority associated with a channel, and the UE 115-*a* may communicate the message(s) on the channel based on the priority. In some cases, the priority indication may be an RRC configuration, the priority indication may be included in the fallback signaling (e.g., control signaling indicating the change of the UE mode) or the priority indication may be included in a separate control signaling.

In some examples, when the control signaling 230-*a* indicates a change of the UE mode from the SBFD mode to the HD mode and the network entity mode is the SBFD mode, the UE 115-*a* may refrain from communicating the message(s) (e.g., message 235-*a* or message 240-*a*). For example, the UE 115-*a* may drop the uplink message, the downlink message or both. In some examples, when the control signaling 230-*a* indicates a change of the UE mode from the SBFD mode to the HD mode and the network entity mode is the SBFD mode, the UE 115-*a* may prioritize one of the messages or drop both messages based on the parameter adaption capacity of the UE 115-*a*. For example, the UE 115-*a* may decide to drop the uplink message, the downlink message or both based on the UE capability.

In some examples, the SBFD capable UE may receive an indication to operate in the UE HD mode or the UE FD mode. In some cases, the network entity 105-*a* may transmit, to the UE 115-*a*, control signaling to indicate the UE SBFD mode and the network entity SBFD mode or the UE HD mode and the network entity HD mode. The indication may be provided to a single UE (e.g., UE 115-*a* or UE 115-*b*) or to a group of UEs. In some cases, the indication may be provided to a group of UEs or cell common UEs by RRC signaling, such as if the network entity suffers high self-interference due to clutter on an omni-directional beam.

In some cases, the UE 115-*a* (or UE 115-*b*) may transition from the UE SBFD mode to the UE HD mode and the network entity 105-*a* may transition from the network entity SBFD mode to the network entity HD mode (e.g., fallback operation from SBFD mode to HD mode). In some examples, if the fallback is to a legacy uplink symbol, the downlink may be dropped. For example, the control signaling may indicate a change of the network entity mode from the SBFD mode to the HD mode, a change of the UE mode from the SBFD mode to the HD mode, a change of a FD slot to an uplink slot, and the messages are an uplink message and a downlink message, the UE 115-*a* may communicate the uplink message in the uplink slot and may refrain from communicating the downlink message in the uplink slot.

In some examples, if the fallback is to a legacy downlink symbol, the uplink may be dropped. For example, the control signaling may indicate a change of the network entity mode from the SBFD mode to the HD mode, a change of the UE mode from the SBFD mode to the HD mode, a change of a FD slot to a downlink slot, and the messages are an uplink message and a downlink message, the UE 115-*a* may communicate the downlink message in the downlink slot and may refrain from communicating the uplink message in the downlink slot.

In some examples, if the fallback is to a legacy flexible symbol, both of the higher layer configured downlink or uplink may be dropped. For example, the control signaling may indicate a change of the network entity mode from the SBFD mode to the HD mode, a change of the UE mode from the SBFD mode to the HD mode, a change of a FD slot to a flexible slot, and the messages are an uplink message and a downlink message, the UE 115-*a* may communicate one of the downlink message or the uplink message in the flexible slot and may refrain from communicating another of the uplink message or the downlink message in the flexible slot. In some cases, the UE 115-*a* may refrain from communication the downlink message and the uplink message in the flexible slot.

In some examples, the control signaling (e.g., control signaling 230-*a* and control signaling 230-*b*) indicating the network entity mode and the UE mode may comprise two or more bits, and the two or more bits may indicate the network entity mode and the UE mode. For example, two bits may be used to indicate the UE mode and network entity mode with values of the two bits being '00' indicating the network entity 105-*a* and the UE 115-*a* switch from any other network entity mode and UE mode to the UE SBFD mode and network entity SBFD mode, '01' indicating the network entity 105-*a* and the UE 115-*a* switch from any other network entity mode and UE mode to the UE HD mode and the network entity SBFD mode, and '10' indicating the network entity 105-*a* and the UE 115-*a* switch from any other network entity mode and UE mode to the UE HD mode and the network entity HD mode.

Figure 5:
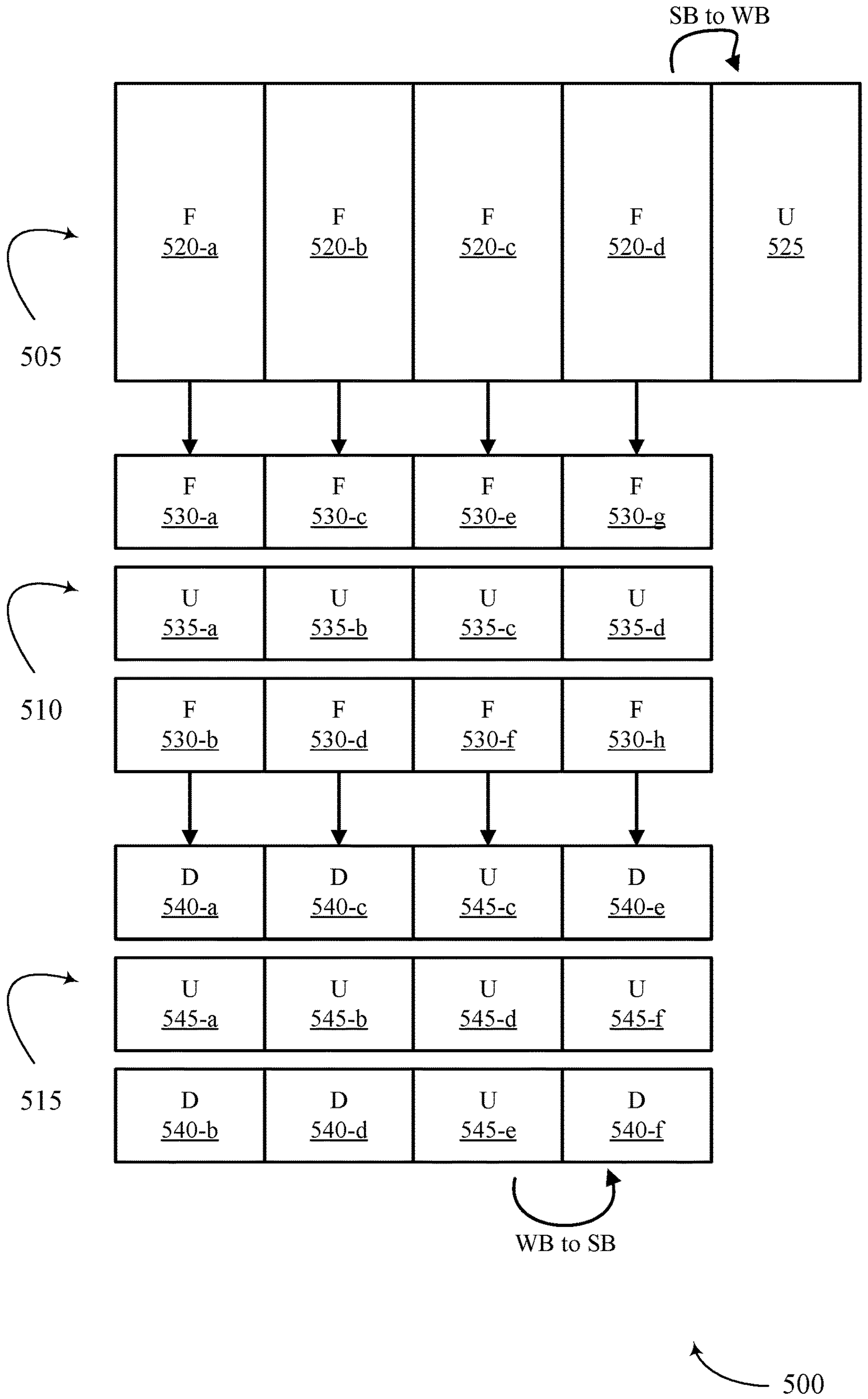
FIG. 5 shows an example of a HD and SBFD patterns that supports techniques for transitioning from FD operation to HD operation in accordance with one or more aspects of the present disclosure.

FIG. 5 shows an example of a HD and SBFD patterns 500 that supports techniques for transitioning from FD operation to HD operation in accordance with one or more aspects of the present disclosure. Aspects of the HD and SBFD patterns 500 may implement, or be implemented by, aspects of wireless communications system 100 and the wireless communications system 200, or any combination thereof.

In some examples, the HD pattern and SBFD patterns 500 may include a HD pattern 505, a SBFD pattern 510, and a SBFD pattern 515. The HD pattern 505 may include a flexible symbol 520-*a*, a flexible symbol 520-*b*, a flexible symbol 520-*c*, a flexible symbol 520-*d*, and an uplink symbol 525. The SBFD pattern 510 may include a flexible subband 530-*a*, an uplink subband 535-*a*, a flexible subband 530-*b*, a flexible subband 530-*c*, an uplink subband 535-*b*, a flexible subband 530-*d*, a flexible subband 530-*e*, an uplink subband 535-*c*, a flexible subband 530-*f*, a flexible subband 530-*g*, an uplink subband 535-*d*, and a flexible subband 530-*h*. In some examples, the SBFD symbols of the SBFD pattern 510 may be configured on the flexible symbols of the HD pattern 505. The SBFD pattern 515 may include a downlink subband 540-*a*, an uplink subband 545-*a*, a downlink subband 540-*b*, a downlink subband 540-*c*, an uplink subband 545-*b*, a downlink subband 540-*d*, an uplink subband 545-*c*, an uplink subband 545-*d*, an uplink subband 545-*e*, a downlink subband 540-*e*, an uplink subband 545-*f*, and a downlink subband 540-*f*. In some examples, the SBFD symbols of the SBFD pattern 515 may be configured on the symbols of the SBFD pattern 510 or the symbols of the HD pattern 505. The HD pattern 505, the SBFD pattern 510, and the SBFD pattern 515 may occupy frequency resources of a component carrier, a bandwidth, or other frequency resource.

For a UE in the SBFD mode or FD mode, the UE 115-*a* may operate in a narrow band in the uplink subband of SBFD symbols (e.g., uplink subband 535-*a*) or the UE 115-*a* may operate in a wideband in legacy uplink symbols (e.g., uplink symbol 525). In some cases, the UE 115-*a* may operate in narrow band in the downlink subband of SBFD symbols with the D+U configuration or operate in the wideband in legacy downlink symbols. When the UE 115-*a* transitions from the SBFD mode to the HD mode or from the HD mode to the SBFD mode, the UE 115-*a* may switch from a narrow band filter operation or a subband filter operation to a wideband filter operation or from the wideband filter operation to the narrow band filter operation or subband filter operation. For example, the UE 115-*a* may switch from narrow band filter operation for the uplink subband of the SBFD symbol to the wideband filter operation for the legacy uplink symbol, and the UE 115-*a* may transition from wideband filter operation for the legacy uplink symbol to the narrow band filter operation for the uplink subband of the SBFD symbol.

In some examples, as a general UE capability, the UE 115-*a* (e.g., SBFD UE, FD UE or SBFD aware UE) may indicate to the network entity 105-*a* that the UE 115-*a* supports a wideband to a subband or narrow band filter switching capability and supports the subband or narrow band to wideband filter switching capability. For example, the UE 115-*a* may transmit, to the network entity 105-*a*, control signaling indicating a capability to switch from a first bandwidth filter operation to a second bandwidth filter operation, from the second bandwidth filter operation to the first bandwidth filter operation, or both. The first bandwidth filter operation may be associated with a first bandwidth that is wider than a second bandwidth associated with the second bandwidth filter operation. In some cases, the first bandwidth filter operation is the wideband filter operation, and the second bandwidth filter operation is the narrow band filter operation or the subband filter operation.

In some cases, the UE 115-*a* may indicate whether the switching from the wideband to the narrow band or subband or the switching from the narrow band or subband to the wideband may have a time gap or may not have a time gap based on the UE capability. In some cases, the switching may be a semi-static switching or a dynamic switching by scheduling for SBFD symbols configured on legacy downlink symbols or flexible symbols. In some examples, the network entity 105-*a* may indicated to the UE 115-*a* to apply the wideband filter (e.g., self-interference impact is small or the dynamic switching to the wideband or subband filter with larger self-interference impact with a cost of an additional time gap). In some cases, the network entity 105-*a* may indicate to the UE 115-*a* to apply the narrow band filter.

For the UE operating in the SBFD mode or FD mode, the UE 115-*a* may operate in the narrow band (e.g., in uplink subband of SBFD symbols) or the UE 115-*a* may operate in the wideband (e.g., in legacy uplink symbols). In another examples, the UE 115-*a* may operate in the narrow band (e.g., in downlink subband of the SBFD symbols with D+U configuration) or operate in wideband (e.g., in legacy D symbols). As a general capability, the SBFD UE or FD UE may indicate to the network entity 105-*a* that the UE 115-*a* supports a wideband to subband or narrow band switching capability and the subband or narrowband to wideband switching capability. For SBFD symbols configured on flexible symbols, if no filter switching within the flexible symbols, the UE 115-*a* may guarantee the subband or narrow filter operation in the SBFD symbols (e.g., D+U+D configured flexible symbols).

In some examples, for SBFD symbols configured on flexible symbols, if no filter switching within the flexible symbols, the slot type may change at the SBFD symbol and non-SBFD symbol boundary. With SBFD symbols, the slot type may not switch from D+U+D to uplink because the narrow band filter is set fixed within the SBFD symbols. In some cases, the network entity 105-*a* may indicate to the UE 115-*a* whether to apply the wideband or narrow band filter within the SBFD symbols. For example, the network entity 105-*a* may transmit control signaling, such as RRC signaling or MAC-CE, indicating to applying the wideband or narrow band filter within SBFD symbols based on traffic or based on UE self-interference cancellation capability (e.g., narrow band transmission uplink filter may be used or not for self-interference mitigation).

In some examples, the narrow band or subband filtering and the wideband filtering may generalize to an uplink filter switching in SBFD operation. For example, one downlink subband and one uplink subband or one uplink subband and two downlink subbands may switch to a whole uplink symbol configuration for non-SBFD operation. In some examples, the narrow band or subband filtering and the wideband filtering may generalize to a downlink filter switching in SBFD operation. For example, one downlink subband and one uplink subband may switch to a whole downlink configuration for non-SBFD operation. The UE 115-*a* may indicate one filter capability for the uplink filter and the downlink filter or indicate separate uplink filter and downlink filter capabilities.

In some examples, the UE 115-*a* may receive, from the network entity 105-*a*, control signaling switching a FD symbol to a HD symbol or the HD symbol to the FD symbol. The UE 115-*a* may communicate a message in the HD symbol or the FD symbol by applying the wideband filter operation or the narrow band or subband filter operation. For example, the control signaling may indicate a change of the FD symbol to the HD symbol and the UE 115-*a* may communicate the message in the HD symbol by applying the wideband filter operation.

In some examples, the control signaling may schedule a flexible symbol as a SBFD symbol, and the UE may receive control signaling indicating which of the wideband filter or the narrow band filter operation to apply within the SBFD symbol. In some cases, the control signaling may schedule a flexible symbol as a SBFD symbol and the UE may refrain from switching the wideband filter operation to the narrow band filter operation or the narrow band filter operation to the wideband filter operation for the flexible symbol. In some cases, the control signaling may schedule a flexible symbol as a SBFD symbol, and the UE may communicate the message in the SBFD symbol by applying the narrow band filter operation or the subband filter operation.

In some examples, the control signaling may change semi-static SBFD symbols configured on flexible symbols to legacy uplink symbols or may change semi-static SBFD symbols configured on downlink symbols with uplink sub-band to legacy uplink symbols, and the UE may receive control signaling indicating which of the wideband filter or the narrow band filter operation to apply within the uplink symbol. In some cases, the UE 115-*a* may refrain from switching the wideband filter operation to the narrow band filter operation or the narrow band filter operation to the wideband filter operation for the uplink symbols. In some cases, the UE 115-*a* may communicate the message in the uplink symbol by applying the narrow band filter operation or the subband filter operation.

In some examples, the control signaling may change SBFD symbols configured on flexible symbols (e.g., with one downlink subband) to legacy downlink symbols or may change semi-static SBFD symbols configured on downlink symbols (e.g., with one downlink subband) to legacy down-link symbols, and the UE may receive control signaling indicating which of the wideband filter or the narrow band filter operation to apply within the symbol. In some cases, the UE may refrain from switching the wideband filter operation to the narrow band filter operation or the narrow band filter operation to the wideband filter operation for the uplink symbol. In some cases, the UE 115-*a* may communicate the message in the uplink symbol by applying the narrow band filter operation or the subband filter operation.

Figure 6:
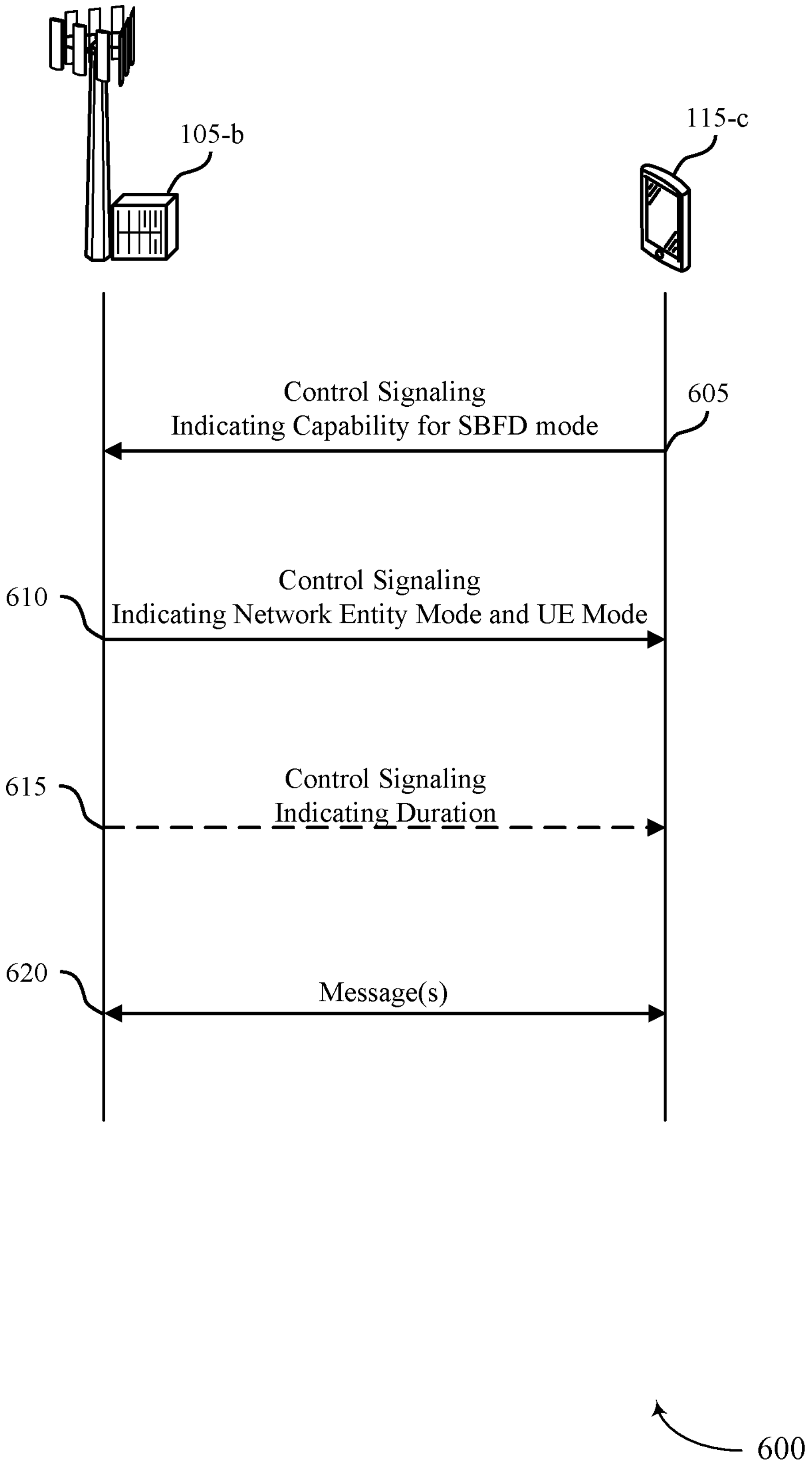
FIG. 6 shows an example of a process flow that supports techniques for transitioning from FD operation to HD operation in accordance with one or more aspects of the present disclosure.

FIG. 6 shows an example of a process flow 600 that supports techniques for transitioning from FD operation to HD operation in accordance with one or more aspects of the present disclosure. In some examples, the process flow 600 may implement or be implemented by aspects of the wireless communications systems 100 and 200 as described with reference to FIGS. 1 and 2, respectively. For example, the process flow 600 may be implemented by a network entity 105-*b*, which may be an example of the network entities 105 as described with reference to FIGS. 1 and 2. The process flow 600 may be implemented by a UE 115-*c*, which may be an example of the UEs as described with reference to FIGS. 1 and 2.

In some examples, the operations illustrated in process flow 600 may be performed by hardware (e.g., including circuitry, processing blocks, logic components, and other components), code such as processor-executable code (e.g., software executed by a processor), or any combination thereof. Alternative examples of the following may be implemented, where some steps are performed in a different order than described or are not performed at all. In some cases, steps may include additional features not mentioned below, or further steps may be added.

At 605, the UE 115-*c* may transmit, to the network entity 105-*b*, first control signaling indicating a capability to operate in a FD mode.

At 610, the UE 115-*c* may receive, from the network entity 105-*b* based at least in part on the first control signaling, second control signaling indicating a network entity mode and a UE mode for communication of one or more messages. The network entity mode may be the FD mode or a HD mode, and the UE mode may be the FD mode or the HD mode. In some examples, the FD mode may be a SBFD mode, a partially overlapping FD mode, or a fully overlapping FD mode. In some examples, the second control signaling may be DCI, group common DCI, RRC signaling, or a MAC CE. In some examples, the second control signaling may be two or more bits, and the two or more bits may indicate the network entity mode and the UE mode.

At 615, the UE 115-*c* may receive, from the network entity 105-*b* based at least in part on the second control signaling, third control signaling indicating a duration associated with the network entity mode, the UE mode, or both.

At 620, the UE 115-*c* may communicate the one or more messages based at least in part on the second control signaling indicating the network entity mode and the UE mode.

In some examples, the second control signaling may indicate a change of the UE mode from the FD mode to the HD mode and the network entity mode is the FD mode, and the UE 115-*c* may communicate the one or more messages on an uplink channel or a downlink channel based at least in part on a prioritized transmission direction. In some examples, the second control signaling may indicate a change of the UE mode from the FD mode to the HD mode and the network entity mode is the FD mode, and the UE 115-*c* may communicate the one or more messages on a first channel or a second channel based at least in part on a prioritization of a channel type of the first channel or a reference signal type or the first channel.

In some examples, the second control signaling may indicate a change of the UE mode from the FD mode to the HD mode and the network entity mode is the FD mode, and the UE 115-*c* may receive, from the network entity, fourth control signaling indicating a priority associated with a first channel. The UE 115-*c* may communicate, based at least in part on the fourth control signaling, the one or more messages on the first channel or on a second channel.

In some examples, the UE 115-*c* may receive fourth control signaling that indicates a change of the UE mode from the SBFD mode to the HD mode, and the UE 115-*c* may refrain from communicating one or more second messages based at least in part on the fourth control signaling.

In some examples, the second control signaling may indicate a change of the network entity mode from the FD mode to the HD mode, a change of the UE mode from the FD mode to the HD mode, and a change of a FD slot to an uplink slot. The one or more messages may comprise an uplink message and a downlink message. The UE 115-*c* may communicate the uplink message in the uplink slot, and the UE 115-*c* may refrain from communicating the downlink message in the uplink slot.

In some examples, the second control signaling may indicate a change of the network entity mode from the FD mode to the HD mode, a change of the UE mode from the FD mode to the HD mode, and a change of a FD slot to a downlink slot. The one or more messages may comprise an uplink message and a downlink message. The UE 115-*c* may communicate the downlink message in the downlink slot, and the UE 115-*c* may refrain from communicating the uplink message in the downlink slot.

In some examples, the second control signaling may indicate a change of the UE mode from the FD mode to the HD mode, a change of the UE mode from the FD mode to the HD mode, and a change of a FD slot to a flexible slot. The one or more messages may comprise an uplink message and a downlink message. The UE 115-*c* may communicate one of the uplink message or the downlink message in the flexible slot, and the UE 115-*c* may refrain from communicating another of the uplink message or the downlink message in the flexible slot.

Figure 7:
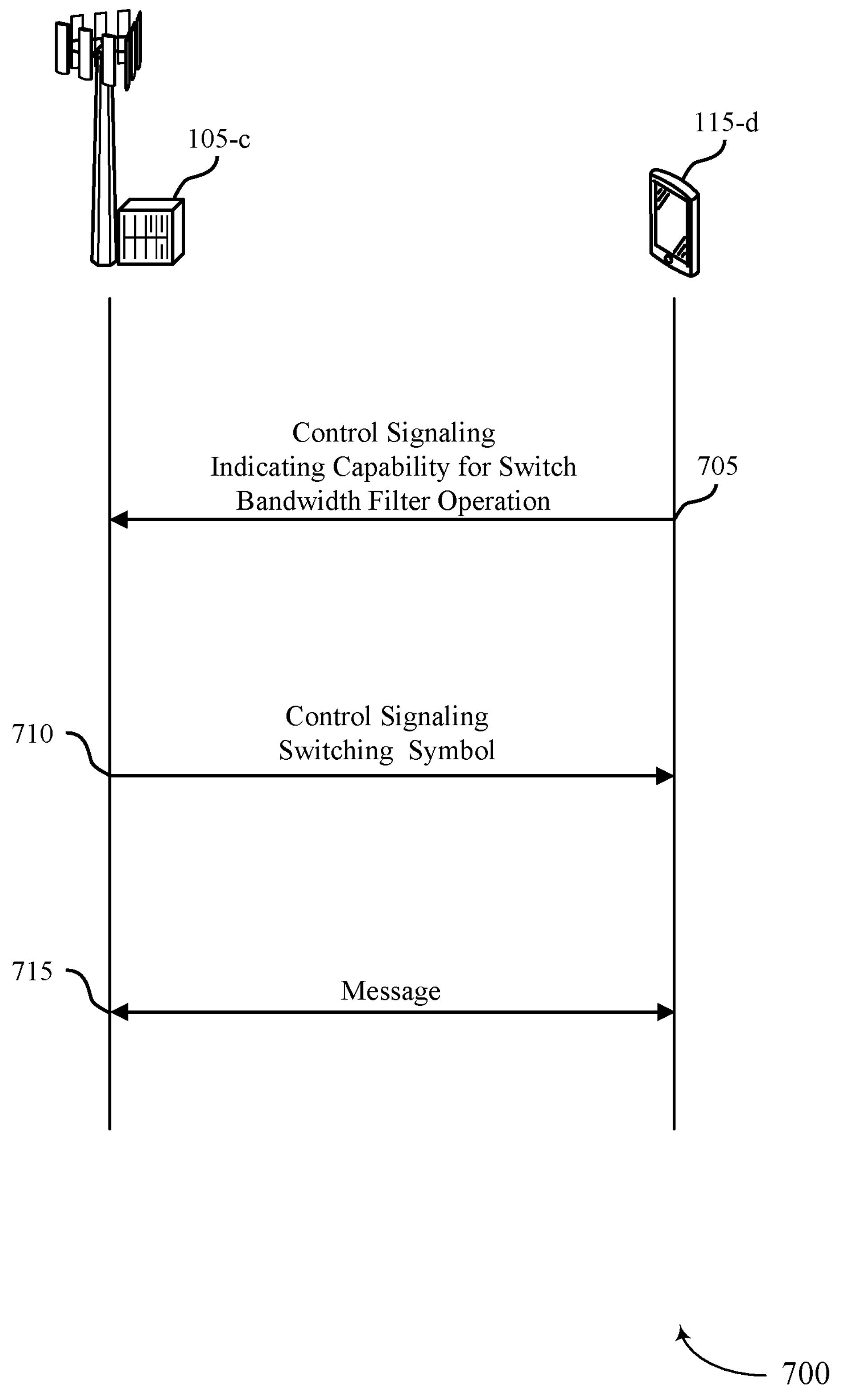
FIG. 7 shows an example of a process flow that supports techniques for transitioning from FD operation to HD operation in accordance with one or more aspects of the present disclosure.

FIG. 7 shows an example of a process flow 700 that supports techniques for transitioning from FD operation to HD operation in accordance with one or more aspects of the present disclosure. In some examples, the process flow 700 may implement or be implemented by aspects of the wireless communications systems 100 and 200 as described with reference to FIGS. 1 and 2, respectively. For example, the process flow 700 may be implemented by a network entity 105-*c*, which may be an example of the network entities 105 as described with reference to FIGS. 1 and 2. The process flow 700 may be implemented by a UE 115-*d*, which may be an example of the UEs as described with reference to FIGS. 1 and 2.

In some examples, the operations illustrated in process flow 700 may be performed by hardware (e.g., including circuitry, processing blocks, logic components, and other components), code such as processor-executable code (e.g., software executed by a processor), or any combination thereof. Alternative examples of the following may be implemented, where some steps are performed in a different order than described or are not performed at all. In some cases, steps may include additional features not mentioned below, or further steps may be added.

At 705, the UE 115-*d* may transmit, to the network entity 105-*c*, first control signaling indicating a capability to switch from a first bandwidth filter operation to a second bandwidth filter operation, from the second bandwidth filter operation to the first bandwidth filter operation, or both. The first bandwidth filter operation is associated a first bandwidth that is wider than a second bandwidth associated with the second bandwidth filter operation. In some examples, the first bandwidth filter operation comprises a wideband filter operation. In some examples, the second bandwidth filter operation comprises a narrow band filter operation or a subband filter operation.

At 710, the UE 115-*d* may receive, from the network entity 105-*c* based at least in part on the first control signaling, second control signaling switching a FD symbol to a HD symbol or the HD symbol to the FD symbol. In some examples, FD symbol may be a SBFD symbol configured on a flexible symbol or the SBFD symbol configured on a downlink symbol, and the HD symbol may be an uplink symbol or a downlink symbol.

At 715, UE 115-*d* may communicate, from the network entity 105-*c* based at least in part on the second control signaling, a message in the HD symbol or the FD symbol by applying the first bandwidth filter operation or the second bandwidth filter operation.

In some examples, the second control signaling indicates a change of the FD symbol to the HD symbol, the UE 115-*d* may communicate the message in the HD symbol by applying the first bandwidth filter operation.

Figure 8:
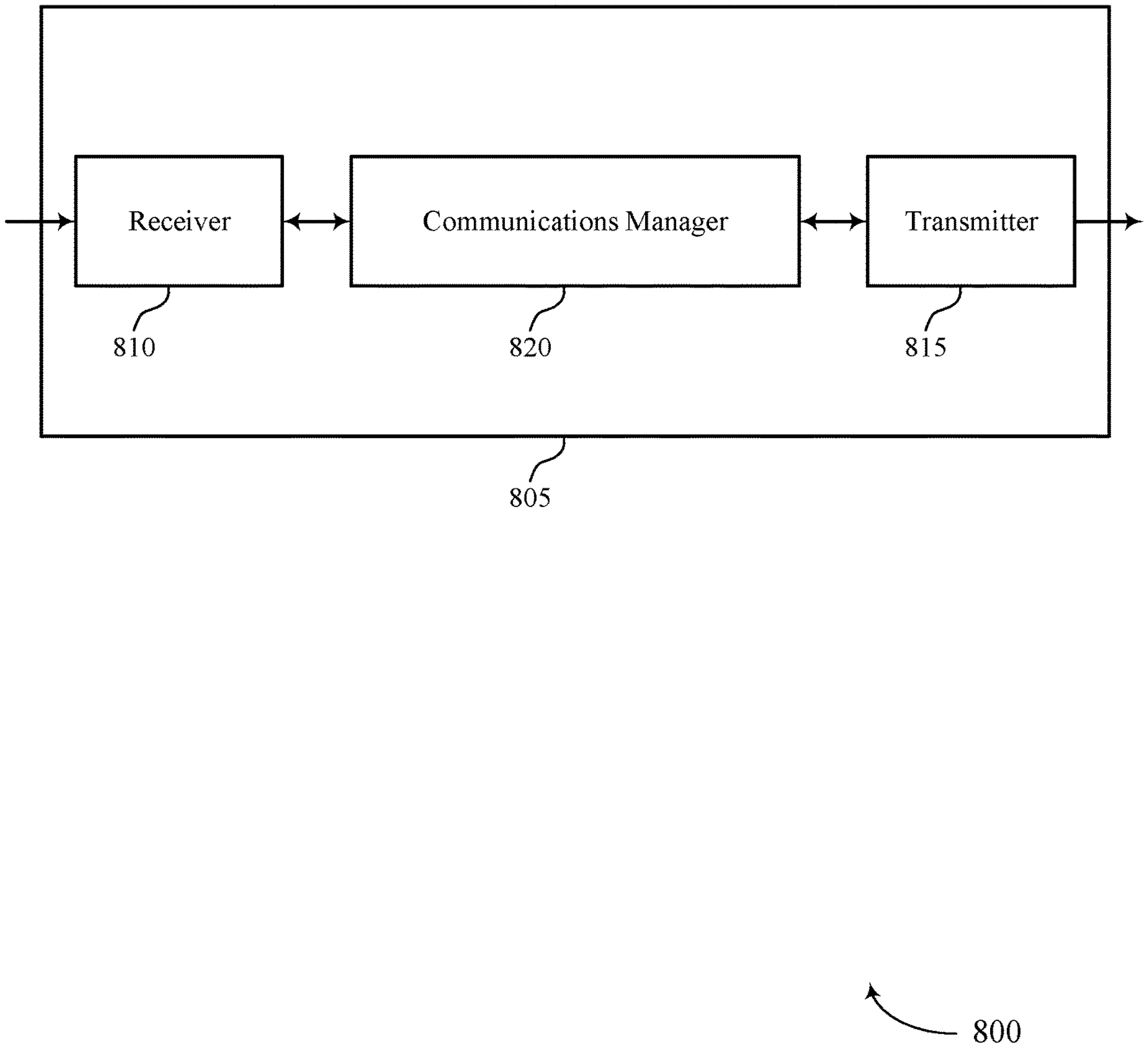
FIGS. 8 and 9 show block diagrams of devices that support techniques for transitioning from FD operation to HD operation in accordance with one or more aspects of the present disclosure.

FIG. 8 shows a block diagram 800 of a device 805 that supports techniques for transitioning from FD operation to HD operation in accordance with one or more aspects of the present disclosure. The device 805 may be an example of aspects of a UE 115 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to, individually or collectively, support or enable the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for transitioning from FD operation to HD operation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for transitioning from FD operation to HD operation). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations or components thereof may be examples of means for performing various aspects of techniques for transitioning from FD operation to HD operation as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor (e.g., referred to as a processor-executable code). If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. For example, the communications manager 820 is capable of, configured to, or operable to support a means for transmitting, to a network entity, first control signaling indicating a capability to operate in a FD mode. The communications manager 820 is capable of, configured to, or operable to support a means for receiving, from the network entity based on the first control signaling, second control signaling indicating a network entity mode and a UE mode for communication of one or more messages, where the network entity mode includes the FD mode or a HD mode and the UE mode includes the FD mode or the HD mode. The communications manager 820 is capable of, configured to, or operable to support a means for communicating the one or more messages based on the second control signaling indicating the network entity mode and the UE mode.

Additionally, or alternatively, the communications manager 820 may support wireless communication in accordance with examples as disclosed herein. For example, the communications manager 820 is capable of, configured to, or operable to support a means for transmitting, to a network entity, first control signaling indicating a capability to switch from a first bandwidth filter operation to a second bandwidth filter operation, from the second bandwidth filter operation to the first bandwidth filter operation, or both, where first bandwidth filter operation is associated a first bandwidth that is wider than a second bandwidth associated with the second bandwidth filter operation. The communications manager 820 is capable of, configured to, or operable to support a means for receiving, from the network entity based on the first control signaling, second control signaling switching a FD symbol to a HD symbol or the HD symbol to the FD symbol. The communications manager 820 is capable of, configured to, or operable to support a means for communicating, with the network entity based on the second control signaling, a message in the HD symbol or the FD symbol by applying the first bandwidth filter operation or the second bandwidth filter operation.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for more efficient utilization of communication resources.

Figure 9:
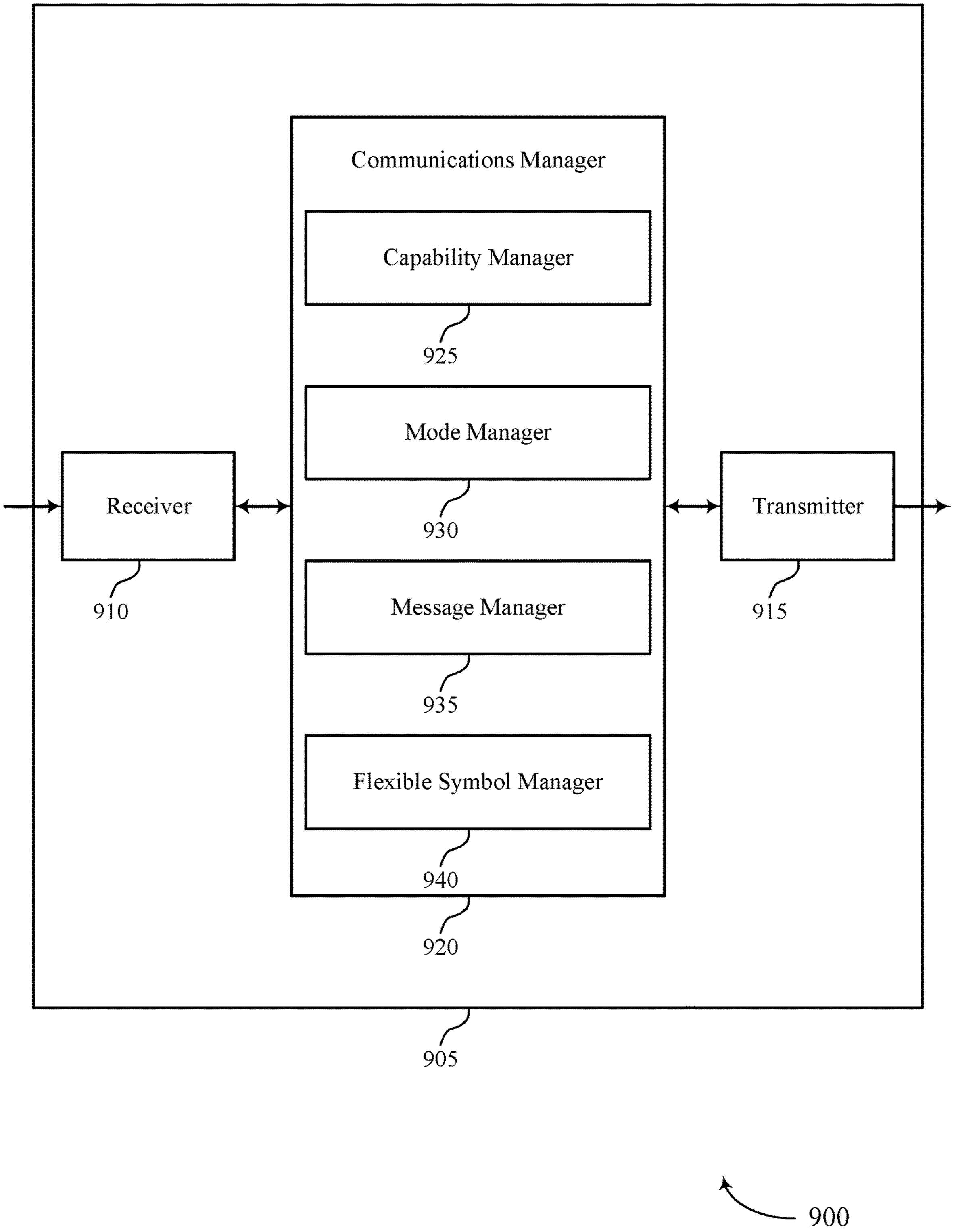

FIG. 9 shows a block diagram 900 of a device 905 that supports techniques for transitioning from FD operation to HD operation in accordance with one or more aspects of the present disclosure. The device 905 may be an example of aspects of a device 805 or a UE 115 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for transitioning from FD operation to HD operation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for transitioning from FD operation to HD operation). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for transitioning from FD operation to HD operation as described herein. For example, the communications manager 920 may include a capability manager 925, a mode manager 930, a message manager 935, a flexible symbol manager 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. The capability manager 925 is capable of, configured to, or operable to support a means for transmitting, to a network entity, first control signaling indicating a capability to operate in a FD mode. The mode manager 930 is capable of, configured to, or operable to support a means for receiving, from the network entity based on the first control signaling, second control signaling indicating a network entity mode and a UE mode for communication of one or more messages, where the network entity mode includes the FD mode or a HD mode and the UE mode includes the FD mode or the HD mode. The message manager 935 is capable of, configured to, or operable to support a means for communicating the one or more messages based on the second control signaling indicating the network entity mode and the UE mode.

Additionally, or alternatively, the communications manager 920 may support wireless communication in accordance with examples as disclosed herein. The capability manager 925 is capable of, configured to, or operable to support a means for transmitting, to a network entity, first control signaling indicating a capability to switch from a first bandwidth filter operation to a second bandwidth filter operation, from the second bandwidth filter operation to the first bandwidth filter operation, or both, where first bandwidth filter operation is associated a first bandwidth that is wider than a second bandwidth associated with the second bandwidth filter operation. The flexible symbol manager 940 is capable of, configured to, or operable to support a means for receiving, from the network entity based on the first control signaling, second control signaling switching a FD symbol to a HD symbol or the HD symbol to the FD symbol. The message manager 935 is capable of, configured to, or operable to support a means for communicating, with the network entity based on the second control signaling, a message in the HD symbol or the FD symbol by applying the first bandwidth filter operation or the second bandwidth filter operation.

Figure 10:
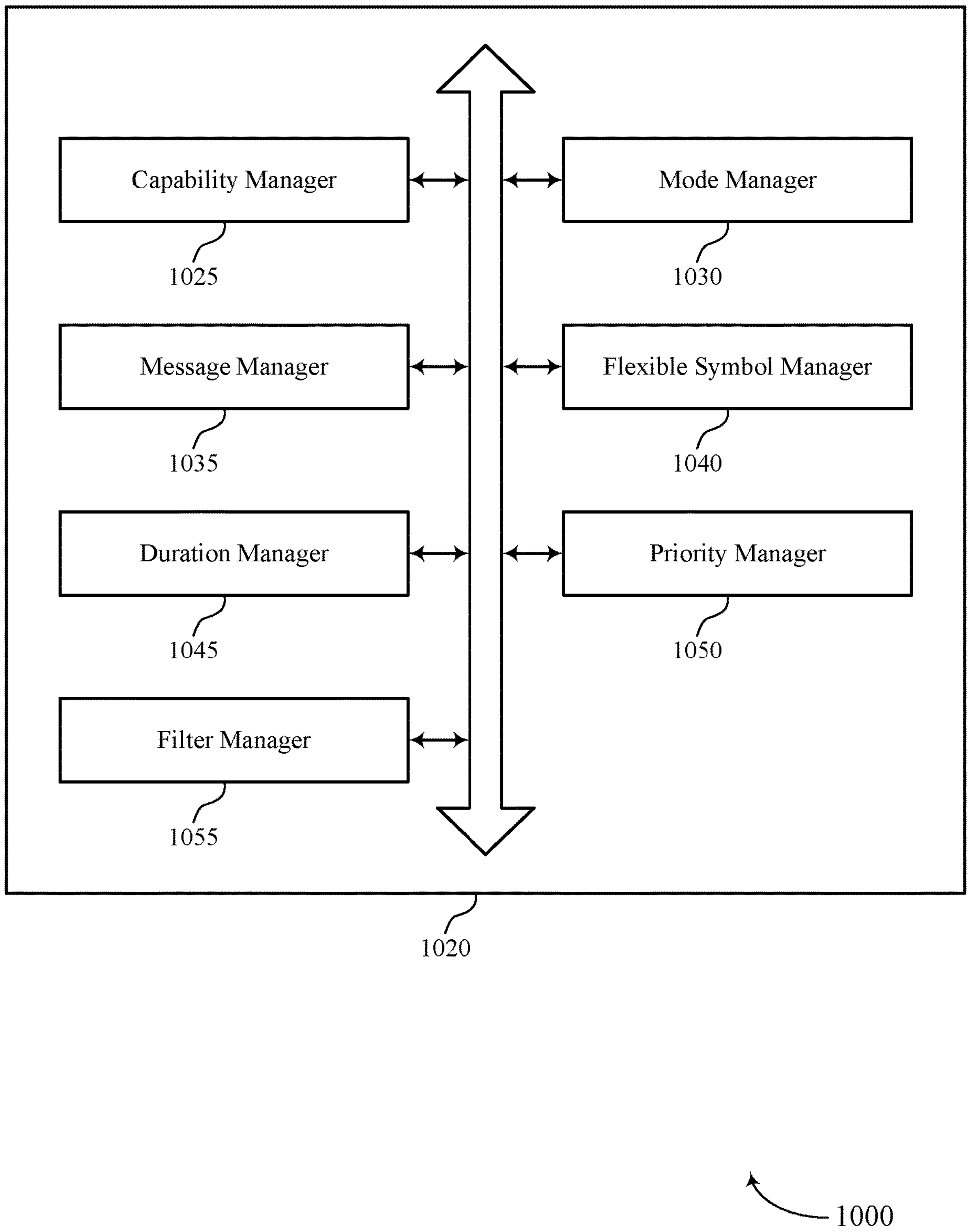
FIG. 10 shows a block diagram of a communications manager that supports techniques for transitioning from FD operation to HD operation in accordance with one or more aspects of the present disclosure.

FIG. 10 shows a block diagram 1000 of a communications manager 1020 that supports techniques for transitioning from FD operation to HD operation in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for transitioning from FD operation to HD operation as described herein. For example, the communications manager 1020 may include a capability manager 1025, a mode manager 1030, a message manager 1035, a flexible symbol manager 1040, a duration manager 1045, a priority manager 1050, a filter manager 1055, or any combination thereof. Each of these components, or components or subcomponents thereof (e.g., one or more processors, one or more memories), may communicate, directly or indirectly, with one another (e.g., via one or more buses).

The communications manager 1020 may support wireless communication in accordance with examples as disclosed herein. The capability manager 1025 is capable of, configured to, or operable to support a means for transmitting, to a network entity, first control signaling indicating a capability to operate in a FD mode. The mode manager 1030 is capable of, configured to, or operable to support a means for receiving, from the network entity based on the first control signaling, second control signaling indicating a network entity mode and a UE mode for communication of one or more messages, where the network entity mode includes the FD mode or a HD mode and the UE mode includes the FD mode or the HD mode. The message manager 1035 is capable of, configured to, or operable to support a means for communicating the one or more messages based on the second control signaling indicating the network entity mode and the UE mode.

In some examples, the duration manager 1045 is capable of, configured to, or operable to support a means for receiving, from the network entity based on the second control signaling, third control signaling indicating a duration associated with the network entity mode, the UE mode, or both.

In some examples, to support communicating the one or more messages, the message manager 1035 is capable of, configured to, or operable to support a means for communicating, based on a prioritized transmission direction, the one or more messages on an uplink channel or a downlink channel.

In some examples, to support communicating the one or more messages, the message manager 1035 is capable of, configured to, or operable to support a means for communicating, based on prioritization of a channel type of a first channel or a reference signal type of the first channel, the one or more messages on the first channel or on a second channel.

In some examples, to support communicating the one or more messages, the priority manager 1050 is capable of, configured to, or operable to support a means for receiving, from the network entity, fourth control signaling indicating a priority associated with a first channel. In some examples, to support communicating the one or more messages, the message manager 1035 is capable of, configured to, or operable to support a means for communicating, based on the fourth control signaling, the one or more messages on the first channel or on a second channel.

In some examples, the mode manager 1030 is capable of, configured to, or operable to support a means for receiving fourth control signaling that indicates a change of the UE mode from the FD mode to the HD mode and the network entity mode is the FD mode. In some examples, the message manager 1035 is capable of, configured to, or operable to support a means for refraining from communicating one or more second messages based on the fourth control signaling.

In some examples, to support communicating the one or more messages, the message manager 1035 is capable of, configured to, or operable to support a means for communicating the uplink message in the uplink slot. In some examples, to support communicating the one or more messages, the message manager 1035 is capable of, configured to, or operable to support a means for refraining from communicating the downlink message in the uplink slot.

In some examples, to support communicating the one or more messages, the message manager 1035 is capable of, configured to, or operable to support a means for communicating the downlink message in the downlink slot. In some examples, to support communicating the one or more messages, the message manager 1035 is capable of, configured to, or operable to support a means for refraining from communicating the uplink message in the downlink slot.

In some examples, to support communicating the one or more messages, the message manager 1035 is capable of, configured to, or operable to support a means for communicating one of the uplink message or the downlink message in the flexible slot. In some examples, to support communicating the one or more messages, the message manager 1035 is capable of, configured to, or operable to support a means for refraining from communicating another of the uplink message or the downlink message in the flexible slot.

In some examples, the second control signaling includes two or more bits. In some examples, the two or more bits indicate the network entity mode and the UE mode.

In some examples, the FD mode includes a SBFD mode, a partially overlapping FD mode, or a fully overlapping FD mode.

In some examples, the second control signaling includes downlink control information, group common downlink control information, radio resource control signaling, or a medium access control control element.

Additionally, or alternatively, the communications manager 1020 may support wireless communication in accordance with examples as disclosed herein. In some examples, the capability manager 1025 is capable of, configured to, or operable to support a means for transmitting, to a network entity, first control signaling indicating a capability to switch from a first bandwidth filter operation to a second bandwidth filter operation, from the second bandwidth filter operation to the first bandwidth filter operation, or both, where first bandwidth filter operation is associated a first bandwidth that is wider than a second bandwidth associated with the second bandwidth filter operation. The flexible symbol manager 1040 is capable of, configured to, or operable to support a means for receiving, from the network entity based on the first control signaling, second control signaling switching a FD symbol to a HD symbol or the HD symbol to the FD symbol. In some examples, the message manager 1035 is capable of, configured to, or operable to support a means for communicating, with the network entity based on the second control signaling, a message in the HD symbol or the FD symbol by applying the first bandwidth filter operation or the second bandwidth filter operation.

In some examples, the first bandwidth filter operation includes a wideband filter operation.

In some examples, the second bandwidth filter operation includes a narrow band filter operation or a subband filter operation.

In some examples, to support communicating the messages, the filter manager 1055 is capable of, configured to, or operable to support a means for communicating the message in the HD symbol by applying the first bandwidth filter operation.

In some examples, the FD symbol includes a SBFD symbol configured on a flexible symbol or the SBFD duplex symbol configured on a downlink symbol.

In some examples, the HD symbol includes an uplink symbol or a downlink symbol.

Figure 11:
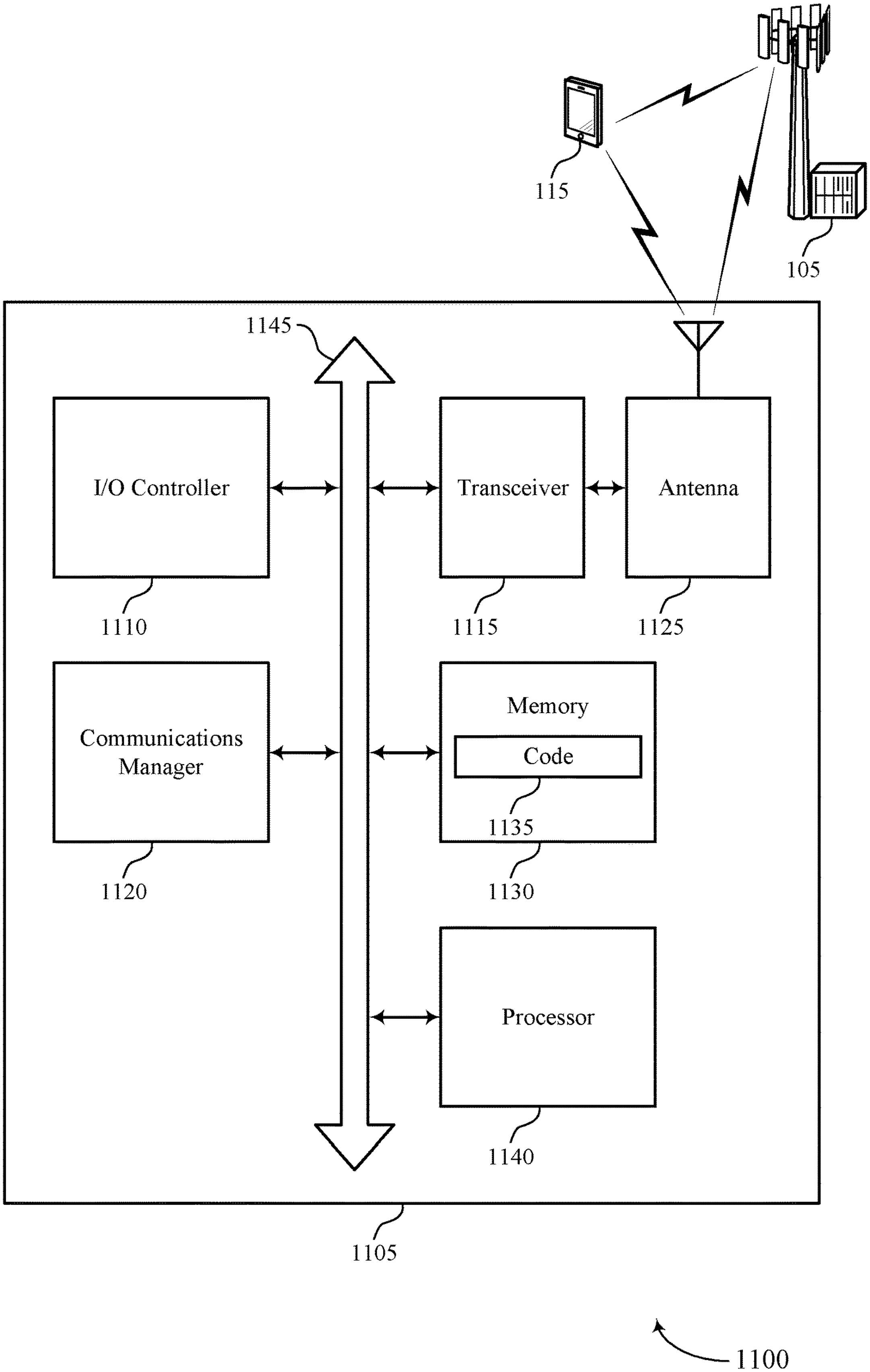
FIG. 11 shows a diagram of a system including a device that supports techniques for transitioning from FD operation to HD operation in accordance with one or more aspects of the present disclosure.

FIG. 11 shows a diagram of a system 1100 including a device 1105 that supports techniques for transitioning from FD operation to HD operation in accordance with one or more aspects of the present disclosure. The device 1105 may be an example of or include components of a device 805, a device 905, or a UE 115 as described herein. The device 1105 may communicate (e.g., wirelessly) with one or more other devices (e.g., network entities 105, UEs 115, or a combination thereof). The device 1105 may include components for bi-directional voice and data communications including components for transmitting and receiving communications, such as a communications manager 1120, an input/output (I/O) controller, such as an I/O controller 1110, a transceiver 1115, one or more antennas 1125, at least one memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140. In some cases, a user may interact with the device 1105 via the I/O controller 1110 or via hardware components controlled by the I/O controller 1110.

In some cases, the device 1105 may include a single antenna. However, in some other cases, the device 1105 may have more than one antenna, which may be capable of concurrently transmitting or receiving multiple wireless transmissions. The transceiver 1115 may communicate bi-directionally via the one or more antennas 1125 using wired or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The at least one memory 1130 may include random access memory (RAM) and read-only memory (ROM). The at least one memory 1130 may store computer-readable, computer-executable, or processor-executable code, such as the code 1135. The code 1135 may include instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may include, among other things, a basic I/O system (BIOS) which may control basic hardware or software operation such as the interaction with peripheral components or devices.

The at least one processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions stored in a memory (e.g., the at least one memory 1130) to cause the device 1105 to perform various functions (e.g., functions or tasks supporting techniques for transitioning from FD operation to HD operation). For example, the device 1105 or a component of the device 1105 may include at least one processor 1140 and at least one memory 1130 coupled with or to the at least one processor 1140, the at least one processor 1140 and the at least one memory 1130 configured to perform various functions described herein. In some examples, the at least one processor 1140 may include multiple processors and the at least one memory 1130 may include multiple memories. One or more of the multiple processors may be coupled with one or more of the multiple memories, which may, individually or collectively, be configured to perform various functions described herein. In some examples, the at least one processor 1140 may be a component of a processing system, which may refer to a system (such as a series) of machines, circuitry (including, for example, one or both of processor circuitry (which may include the at least one processor 1140) and memory circuitry (which may include the at least one memory 1130)), or components, that receives or obtains inputs and processes the inputs to produce, generate, or obtain a set of outputs. The processing system may be configured to perform one or more of the functions described herein. For example, the at least one processor 1140 or a processing system including the at least one processor 1140 may be configured to, configurable to, or operable to cause the device 1105 to perform one or more of the functions described herein. Further, as described herein, being "configured to," being "configurable to," and being "operable to" may be used interchangeably and may be associated with a capability, when executing code 1135 (e.g., processor-executable code) stored in the at least one memory 1130 or otherwise, to perform one or more of the functions described herein.

The communications manager 1120 may support wireless communication in accordance with examples as disclosed herein. For example, the communications manager 1120 is capable of, configured to, or operable to support a means for transmitting, to a network entity, first control signaling indicating a capability to operate in a FD mode. The communications manager 1120 is capable of, configured to, or operable to support a means for receiving, from the network entity based on the first control signaling, second control signaling indicating a network entity mode and a UE mode for communication of one or more messages, where the network entity mode includes the FD mode or a HD mode and the UE mode includes the FD mode or the HD mode. The communications manager 1120 is capable of, configured to, or operable to support a means for communicating the one or more messages based on the second control signaling indicating the network entity mode and the UE mode.

Additionally, or alternatively, the communications manager 1120 may support wireless communication in accordance with examples as disclosed herein. For example, the communications manager 1120 is capable of, configured to, or operable to support a means for transmitting, to a network entity, first control signaling indicating a capability to switch from a first bandwidth filter operation to a second bandwidth filter operation, from the second bandwidth filter operation to the first bandwidth filter operation, or both, where first bandwidth filter operation is associated a first bandwidth that is wider than a second bandwidth associated with the second bandwidth filter operation. The communications manager 1120 is capable of, configured to, or operable to support a means for receiving, from the network entity based on the first control signaling, second control signaling switching a FD symbol to a HD symbol or the HD symbol to the FD symbol. The communications manager 1120 is capable of, configured to, or operable to support a means for communicating, with the network entity based on the second control signaling, a message in the HD symbol or the FD symbol by applying the first bandwidth filter operation or the second bandwidth filter operation.

By including or configuring the communications manager 1120 in accordance with examples as described herein, the device 1105 may support techniques for improved communication reliability, reduced latency, more efficient utilization of communication resources, and improved coordination between devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of techniques for transitioning from FD operation to HD operation as described herein, or the at least one processor 1140 and the at least one memory 1130 may be otherwise configured to, individually or collectively, perform or support such operations.

Figure 12:
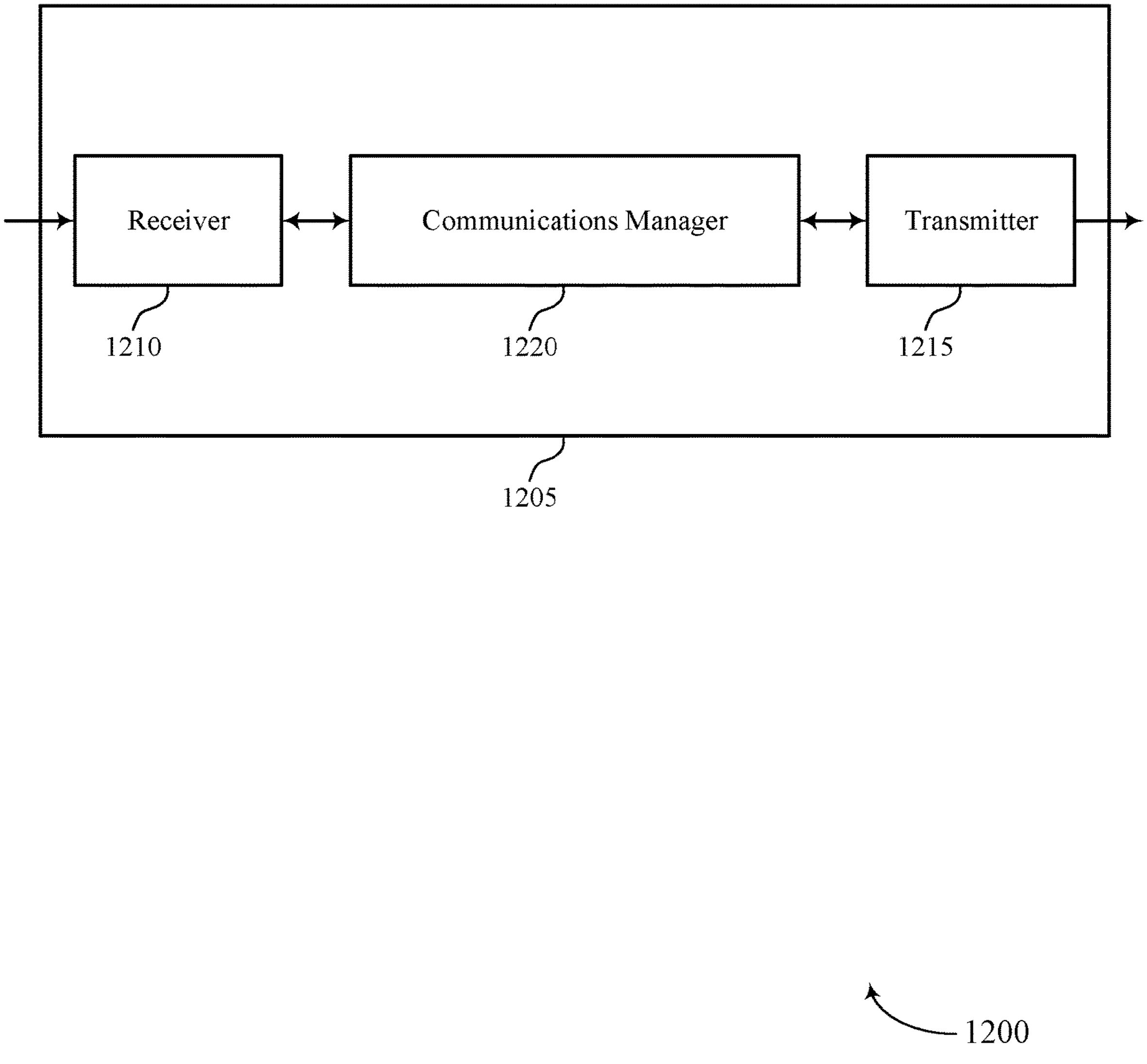
FIGS. 12 and 13 show block diagrams of devices that support techniques for transitioning from FD operation to HD operation in accordance with one or more aspects of the present disclosure.

FIG. 12 shows a block diagram 1200 of a device 1205 that supports techniques for transitioning from FD operation to HD operation in accordance with one or more aspects of the present disclosure. The device 1205 may be an example of aspects of a network entity 105 as described herein. The device 1205 may include a receiver 1210, a transmitter 1215, and a communications manager 1220. The device 1205, or one or more components of the device 1205 (e.g., the receiver 1210, the transmitter 1215, the communications manager 1220), may include at least one processor, which may be coupled with at least one memory, to, individually or collectively, support or enable the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations or components thereof may be examples of means for performing various aspects of techniques for transitioning from FD operation to HD operation as described herein. For example, the communications manager 1220, the receiver 1210, the transmitter 1215, or various combinations or components thereof may be capable of performing one or more of the functions described herein.

In some examples, the communications manager 1220, the receiver 1210, the transmitter 1215, or various combinations or components thereof may be implemented in hardware (e.g., in communications management circuitry).

The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1220, the receiver 1210, the transmitter 1215, or various combinations or components thereof may be implemented in code (e.g., as communications management software or firmware) executed by at least one processor (e.g., referred to as a processor-executable code). If implemented in code executed by at least one processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication in accordance with examples as disclosed herein. For example, the communications manager 1220 is capable of, configured to, or operable to support a means for obtaining, from a UE, first control signaling indicating a capability to operate in a FD mode. The communications manager 1220 is capable of, configured to, or operable to support a means for outputting, to the UE based on the first control signaling, second control signaling indicating a network entity mode and a UE mode for communication of one or more messages, where the network entity mode includes the FD mode or a HD mode and the UE mode includes the FD mode or the HD mode. The communications manager 1220 is capable of, configured to, or operable to support a means for communicating the one or more messages based on the second control signaling indicating the network entity mode and the UE mode.

Additionally, or alternatively, the communications manager 1220 may support wireless communication in accordance with examples as disclosed herein. For example, the communications manager 1220 is capable of, configured to, or operable to support a means for obtaining, from a UE, first control signaling indicating a capability to switch from a first bandwidth filter operation to a second bandwidth filter operation, from the second bandwidth filter operation to the first bandwidth filter operation, or both, where the first bandwidth filter operation is associated a first bandwidth that is wider than a second bandwidth associated with the second bandwidth filter operation. The communications manager 1220 is capable of, configured to, or operable to support a means for outputting, to the UE based on the first control signaling, second control signaling switching a FD symbol to HD symbol or the HD symbol to the FD symbol. The communications manager 1220 is capable of, configured to, or operable to support a means for communicating, with the UE based on the second control signaling, a message in the FD symbol or the HD symbol.

By including or configuring the communications manager 1220 in accordance with examples as described herein, the device 1205 (e.g., at least one processor controlling or otherwise coupled with the receiver 1210, the transmitter 1215, the communications manager 1220, or a combination thereof) may support techniques for more efficient utilization of communication resources.

Figure 13:
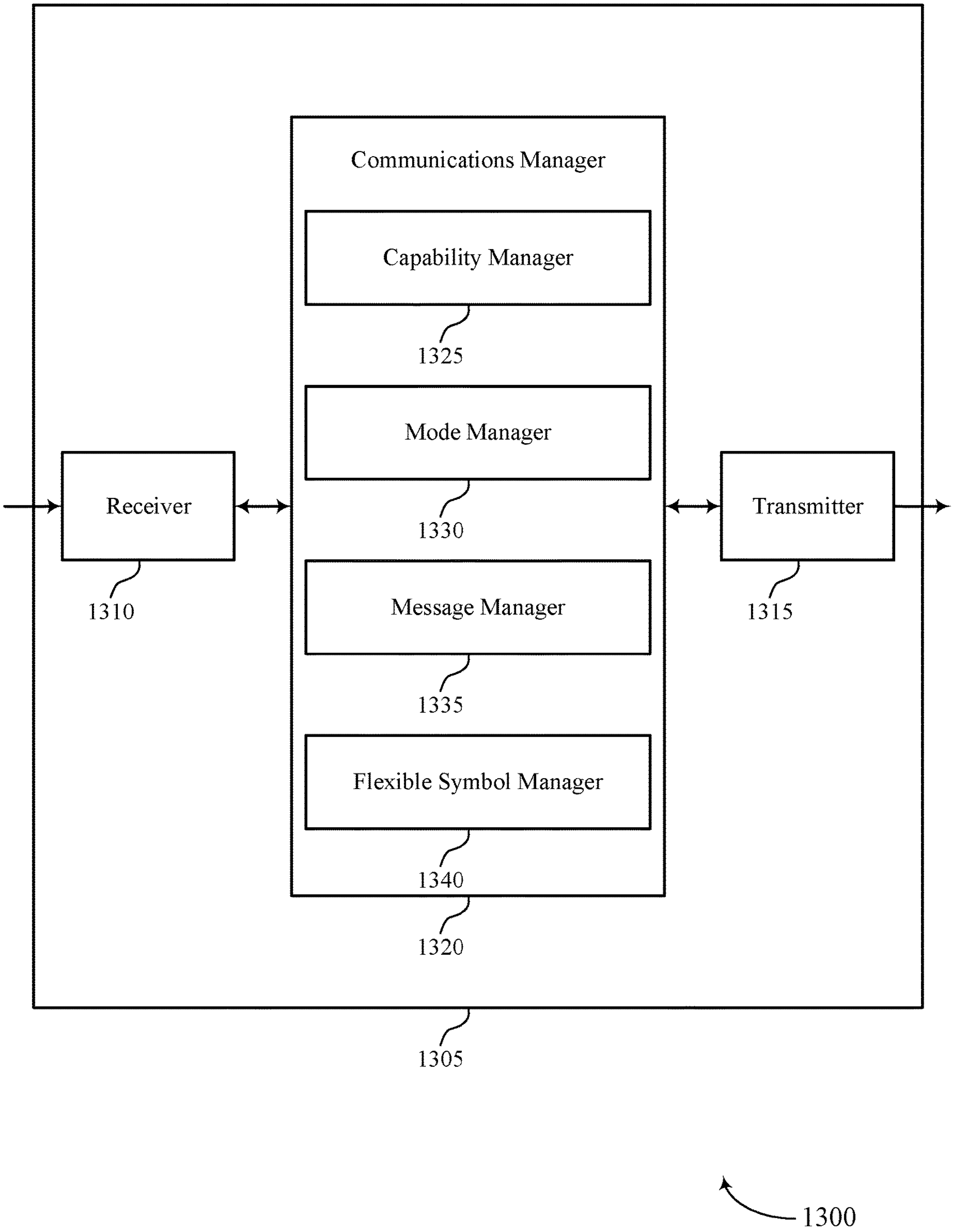

FIG. 13 shows a block diagram 1300 of a device 1305 that supports techniques for transitioning from FD operation to HD operation in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305, or one or more components of the device 1305 (e.g., the receiver 1310, the transmitter 1315, the communications manager 1320), may include at least one processor, which may be coupled with at least one memory, to support the described techniques. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of techniques for transitioning from FD operation to HD operation as described herein. For example, the communications manager 1320 may include a capability manager 1325, a mode manager 1330, a message manager 1335, a flexible symbol manager 1340, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication in accordance with examples as disclosed herein. The capability manager 1325 is capable of, configured to, or operable to support a means for obtaining, from a UE, first control signaling indicating a capability to operate in a FD mode. The mode manager 1330 is capable of, configured to, or operable to support a means for outputting, to the UE based on the first control signaling, second control signaling indicating a network entity mode and a UE mode for communication of one or more messages, where the network entity mode includes the FD mode or a HD mode and the UE mode includes the FD mode or the HD mode. The message manager 1335 is capable of, configured to, or operable to support a means for communicating the one or more messages based on the second control signaling indicating the network entity mode and the UE mode.

Additionally, or alternatively, the communications manager 1320 may support wireless communication in accordance with examples as disclosed herein. The capability manager 1325 is capable of, configured to, or operable to support a means for obtaining, from a UE, first control signaling indicating a capability to switch from a first bandwidth filter operation to a second bandwidth filter operation, from the second bandwidth filter operation to the first bandwidth filter operation, or both, where the first bandwidth filter operation is associated a first bandwidth that is wider than a second bandwidth associated with the second bandwidth filter operation. The flexible symbol manager 1340 is capable of, configured to, or operable to support a means for outputting, to the UE based on the first control signaling, second control signaling switching a FD symbol to HD symbol or the HD symbol to the FD symbol. The message manager 1335 is capable of, configured to, or operable to support a means for communicating, with the UE based on the second control signaling, a message in the FD symbol or the HD symbol.

Figure 14:
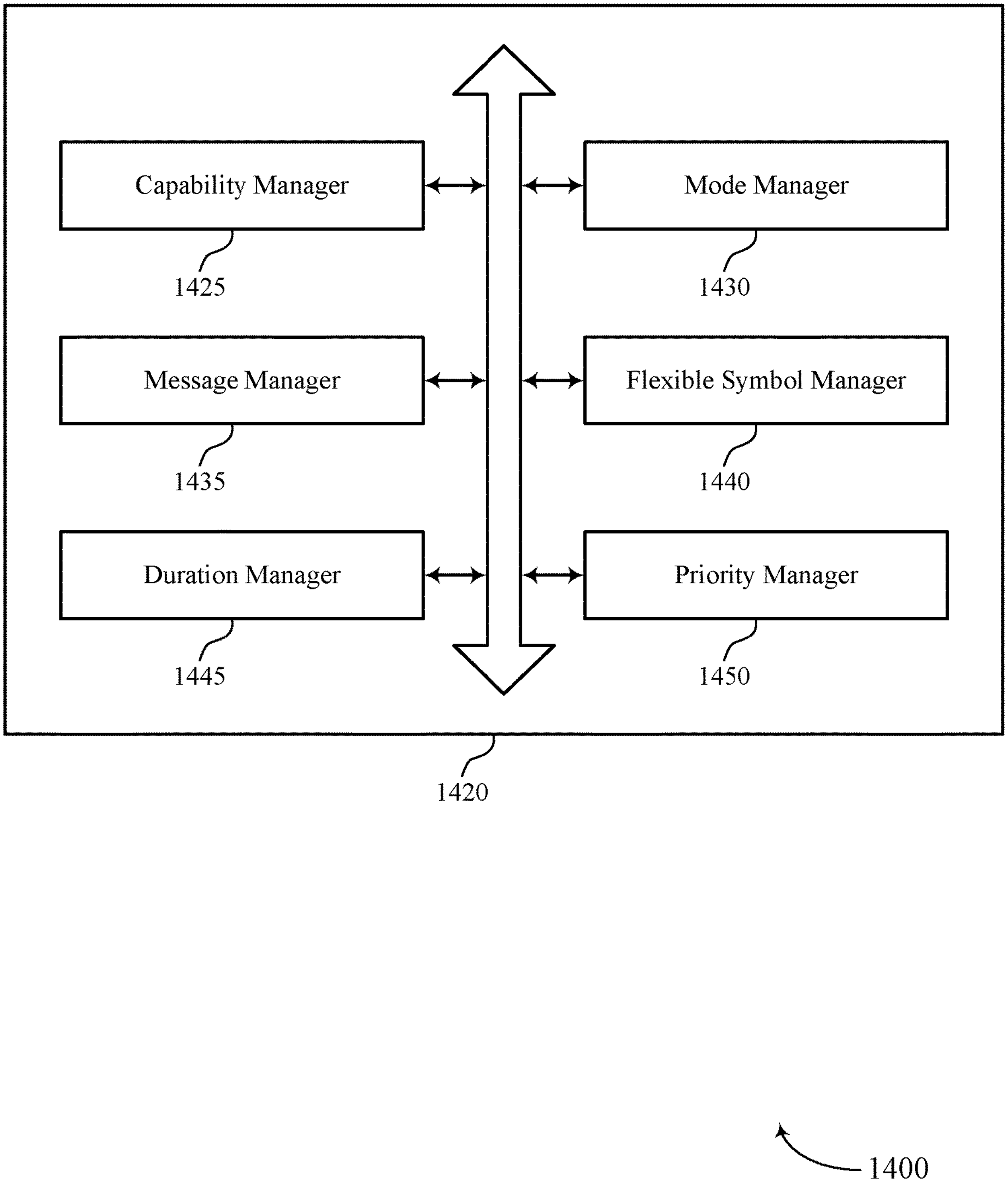
FIG. 14 shows a block diagram of a communications manager that supports techniques for transitioning from FD operation to HD operation in accordance with one or more aspects of the present disclosure.

FIG. 14 shows a block diagram 1400 of a communications manager 1420 that supports techniques for transitioning from FD operation to HD operation in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of techniques for transitioning from FD operation to HD operation as described herein. For example, the communications manager 1420 may include a capability manager 1425, a mode manager 1430, a message manager 1435, a flexible symbol manager 1440, a duration manager 1445, a priority manager 1450, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication in accordance with examples as disclosed herein. The capability manager 1425 is capable of, configured to, or operable to support a means for obtaining, from a UE, first control signaling indicating a capability to operate in a FD mode. The mode manager 1430 is capable of, configured to, or operable to support a means for outputting, to the UE based on the first control signaling, second control signaling indicating a network entity mode and a UE mode for communication of one or more messages, where the network entity mode includes the FD mode or a HD mode and the UE mode includes the FD mode or the HD mode. The message manager 1435 is capable of, configured to, or operable to support a means for communicating the one or more messages based on the second control signaling indicating the network entity mode and the UE mode.

In some examples, the duration manager 1445 is capable of, configured to, or operable to support a means for outputting, to the UE based on the second control signaling, third control signaling indicating a duration associated with the network entity mode, and the UE mode, or both.

In some examples, to support communicating the one or more messages, the priority manager 1450 is capable of, configured to, or operable to support a means for outputting, to the UE, fourth control signaling indicating a priority associated with a first channel. In some examples, to support communicating the one or more messages, the message manager 1435 is capable of, configured to, or operable to support a means for communicating, based on the fourth control signaling, the one or more messages on the first channel or a second channel.

In some examples, to support communicating the one or more messages, the mode manager 1430 is capable of, configured to, or operable to support a means for outputting fourth control signaling that indicates a change of the UE mode from the FD mode to the HD mode. In some examples, to support communicating the one or more messages, the message manager 1435 is capable of, configured to, or operable to support a means for refraining from communicating one or more second messages based on the fourth control signaling.

In some examples, to support communicating the one or more messages, the message manager 1435 is capable of, configured to, or operable to support a means for communicating the uplink message in the uplink slot. In some examples, to support communicating the one or more messages, the message manager 1435 is capable of, configured to, or operable to support a means for refraining from communicating the downlink message in the uplink slot.

In some examples, to support communicating the one or more messages, the message manager 1435 is capable of, configured to, or operable to support a means for communicating the downlink message in the downlink slot. In some examples, to support communicating the one or more messages, the message manager 1435 is capable of, configured to, or operable to support a means for refraining from communicating the uplink message in the downlink slot.

In some examples, to support communicating the one or more messages, the message manager 1435 is capable of, configured to, or operable to support a means for communicating the uplink message in the flexible slot. In some examples, to support communicating the one or more messages, the message manager 1435 is capable of, configured to, or operable to support a means for refraining from communicating another uplink message or the downlink message in the flexible slot.

In some examples, the second control signaling includes two or more bits. In some examples, the two or more bits indicate the network entity mode and the UE mode.

Additionally, or alternatively, the communications manager 1420 may support wireless communication in accordance with examples as disclosed herein. In some examples, the capability manager 1425 is capable of, configured to, or operable to support a means for obtaining, from a UE, first control signaling indicating a capability to switch from a first bandwidth filter operation to a second bandwidth filter operation, from the second bandwidth filter operation to the first bandwidth filter operation, or both, where the first bandwidth filter operation is associated a first bandwidth that is wider than a second bandwidth associated with the second bandwidth filter operation. The flexible symbol manager 1440 is capable of, configured to, or operable to support a means for outputting, to the UE based on the first control signaling, second control signaling switching a FD symbol to HD symbol or the HD symbol to the FD symbol. In some examples, the message manager 1435 is capable of, configured to, or operable to support a means for communicating, with the UE based on the second control signaling, a message in the FD symbol or the HD symbol.

In some examples, the first bandwidth filter operation includes a wideband filter operation and the second bandwidth filter operation includes a narrow band filter operation or a subband filter operation.

In some examples, to support communicating the message, the message manager 1435 is capable of, configured to, or operable to support a means for communicating the message in the HD symbol by applying the first bandwidth filter operation.

In some examples, the FD symbol includes a SBFD symbol configured on a flexible symbol or the SBFD symbol configured on a downlink symbol and the HD symbol includes an uplink symbol or a downlink symbol.

Figure 15:
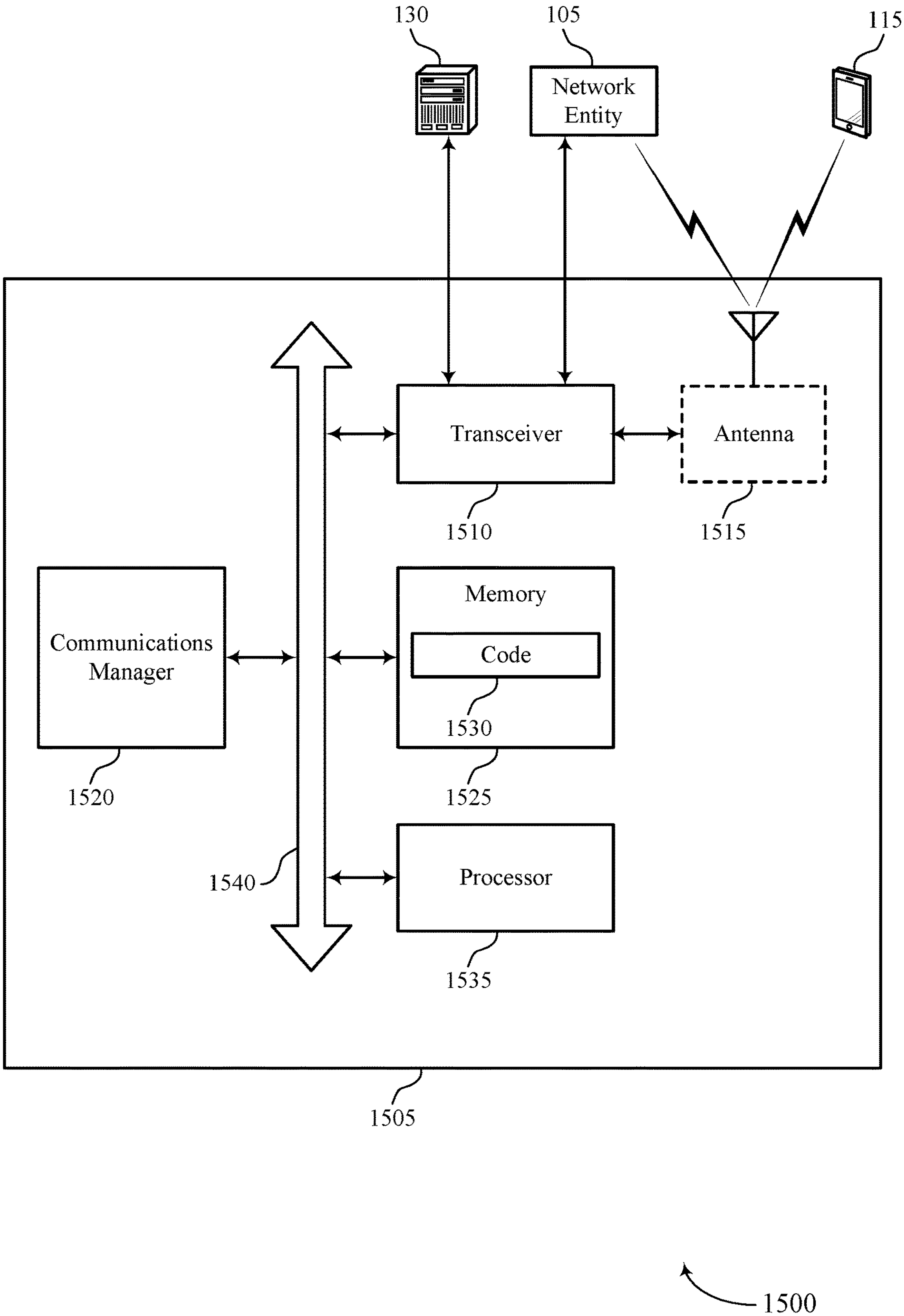
FIG. 15 shows a diagram of a system including a device that supports techniques for transitioning from FD operation to HD operation in accordance with one or more aspects of the present disclosure.

FIG. 15 shows a diagram of a system 1500 including a device 1505 that supports techniques for transitioning from FD operation to HD operation in accordance with one or more aspects of the present disclosure. The device 1505 may be an example of or include components of a device 1205, a device 1305, or a network entity 105 as described herein. The device 1505 may communicate with other network devices or network equipment such as one or more of the network entities 105, UEs 115, or any combination thereof. The communications may include communications over one or more wired interfaces, over one or more wireless interfaces, or any combination thereof. The device 1505 may include components that support outputting and obtaining communications, such as a communications manager 1520, a transceiver 1510, one or more antennas 1515, at least one memory 1525, code 1530, and at least one processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or one or more memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or one or more memory components (e.g., the at least one processor 1535, the at least one memory 1525, or both), may be included in a chip or chip assembly that is installed in the device 1505. In some examples, the transceiver 1510 may be operable to support communications via one or more communications links (e.g., a communication link 125, a backhaul communication link 120, a midhaul communication link 162, a fronthaul communication link 168).

The at least one memory 1525 may include RAM, ROM, or any combination thereof. The at least one memory 1525 may store computer-readable, computer-executable, or processor-executable code, such as the code 1530. The code 1530 may include instructions that, when executed by one or more of the at least one processor 1535, cause the device 1505 to perform various functions described herein. The code 1530 may be stored in a non-transitory computer-readable medium such as system memory or another type of memory. In some cases, the code 1530 may not be directly executable by a processor of the at least one processor 1535 but may cause a computer (e.g., when compiled and executed) to perform functions described herein. In some cases, the at least one memory 1525 may include, among other things, a BIOS which may control basic hardware or software operation such as the interaction with peripheral components or devices. In some examples, the at least one processor 1535 may include multiple processors and the at least one memory 1525 may include multiple memories. One or more of the multiple processors may be coupled with one or more of the multiple memories which may, individually or collectively, be configured to perform various functions herein (for example, as part of a processing system).

The at least one processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1535 may be configured to operate a memory array using a memory controller. In some other cases, a memory controller may be integrated into one or more of the at least one processor 1535. The at least one processor 1535 may be configured to execute computer-readable instructions stored in a memory (e.g., one or more of the at least one memory 1525) to cause the device 1505 to perform various functions (e.g., functions or tasks supporting techniques for transitioning from FD operation to HD operation). For example, the device 1505 or a component of the device 1505 may include at least one processor 1535 and at least one memory 1525 coupled with one or more of the at least one processor 1535, the at least one processor 1535 and the at least one memory 1525 configured to perform various functions described herein. The at least one processor 1535 may be an example of a cloud-computing platform (e.g., one or more physical nodes and supporting software such as operating systems, virtual machines, or container instances) that may host the functions (e.g., by executing code 1530) to perform the functions of the device 1505. The at least one processor 1535 may be any one or more suitable processors capable of executing scripts or instructions of one or more software programs stored in the device 1505 (such as within one or more of the at least one memory 1525). In some examples, the at least one processor 1535 may include multiple processors and the at least one memory 1525 may include multiple memories. One or more of the multiple processors may be coupled with one or more of the multiple memories, which may, individually or collectively, be configured to perform various functions herein. In some examples, the at least one processor 1535 may be a component of a processing system, which may refer to a system (such as a series) of machines, circuitry (including, for example, one or both of processor circuitry (which may include the at least one processor 1535) and memory circuitry (which may include the at least one memory 1525)), or components, that receives or obtains inputs and processes the inputs to produce, generate, or obtain a set of outputs. The processing system may be configured to perform one or more of the functions described herein. For example, the at least one processor 1535 or a processing system including the at least one processor 1535 may be configured to, configurable to, or operable to cause the device 1505 to perform one or more of the functions described herein. Further, as described herein, being "configured to," being "configurable to," and being "operable to" may be used interchangeably and may be associated with a capability, when executing code stored in the at least one memory 1525 or otherwise, to perform one or more of the functions described herein.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the at least one memory 1525, the code 1530, and the at least one processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication in accordance with examples as disclosed herein. For example, the communications manager 1520 is capable of, configured to, or operable to support a means for obtaining, from a UE, first control signaling indicating a capability to operate in a FD mode. The communications manager 1520 is capable of, configured to, or operable to support a means for outputting, to the UE based on the first control signaling, second control signaling indicating a network entity mode and a UE mode for communication of one or more messages, where the network entity mode includes the FD mode or a HD mode and the UE mode includes the FD mode or the HD mode. The communications manager 1520 is capable of, configured to, or operable to support a means for communicating the one or more messages based on the second control signaling indicating the network entity mode and the UE mode.

Additionally, or alternatively, the communications manager 1520 may support wireless communication in accordance with examples as disclosed herein. For example, the communications manager 1520 is capable of, configured to, or operable to support a means for obtaining, from a UE, first control signaling indicating a capability to switch from a first bandwidth filter operation to a second bandwidth filter operation, from the second bandwidth filter operation to the first bandwidth filter operation, or both, where the first bandwidth filter operation is associated a first bandwidth that is wider than a second bandwidth associated with the second bandwidth filter operation. The communications manager 1520 is capable of, configured to, or operable to support a means for outputting, to the UE based on the first control signaling, second control signaling switching a FD symbol to HD symbol or the HD symbol to the FD symbol. The communications manager 1520 is capable of, configured to, or operable to support a means for communicating, with the UE based on the second control signaling, a message in the FD symbol or the HD symbol.

By including or configuring the communications manager 1520 in accordance with examples as described herein, the device 1505 may support techniques for improved communication reliability, reduced latency, more efficient utilization of communication resources, and improved coordination between devices.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, one or more of the at least one processor 1535, one or more of the at least one memory 1525, the code 1530, or any combination thereof (for example, by a processing system including at least a portion of the at least one processor 1535, the at least one memory 1525, the code 1530, or any combination thereof). For example, the code 1530 may include instructions executable by one or more of the at least one processor 1535 to cause the device 1505 to perform various aspects of techniques for transitioning from FD operation to HD operation as described herein, or the at least one processor 1535 and the at least one memory 1525 may be otherwise configured to, individually or collectively, perform or support such operations.

Figure 16:
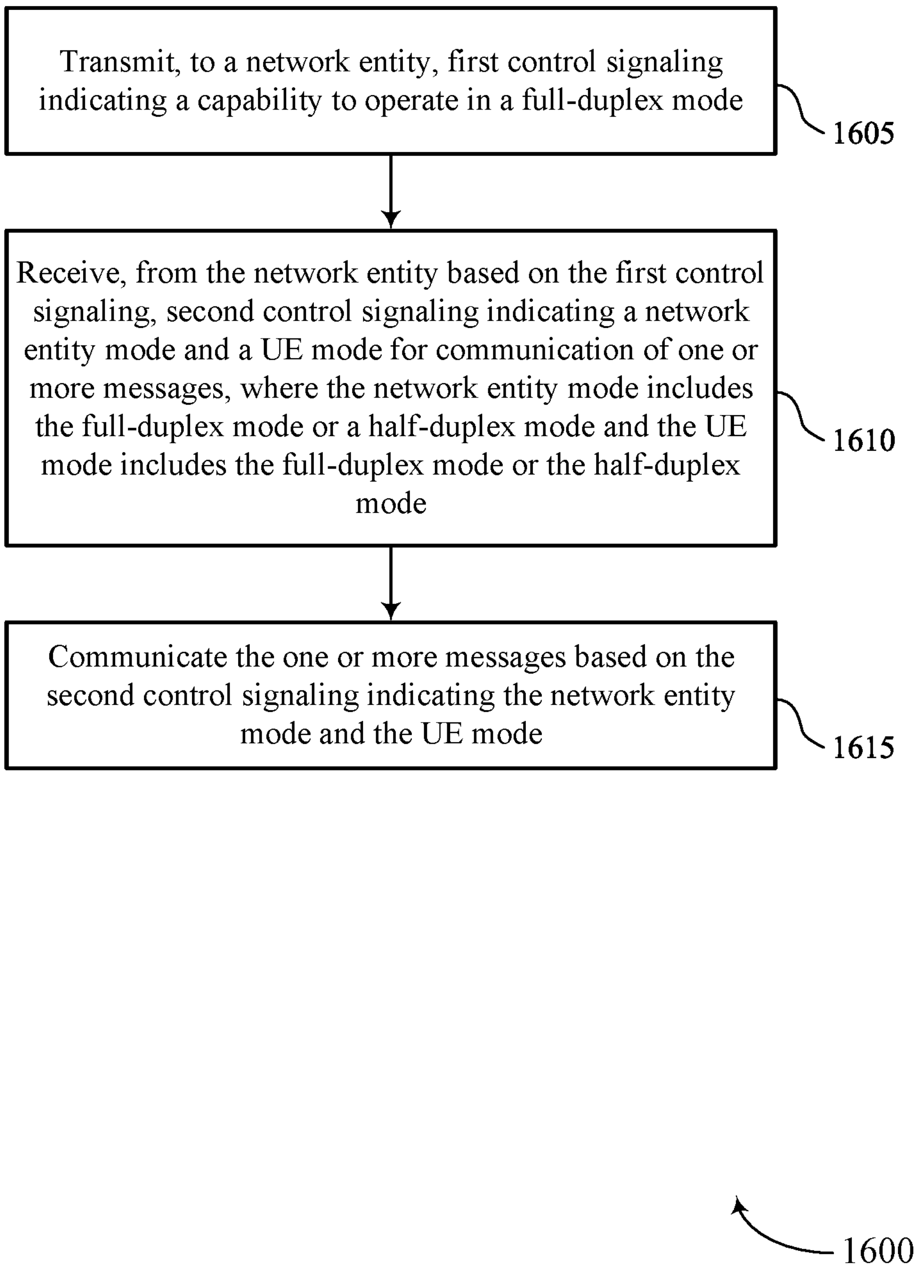
FIGS. 16 through 19 show flowcharts illustrating methods that support techniques for transitioning from FD operation to HD operation in accordance with one or more aspects of the present disclosure.

FIG. 16 shows a flowchart illustrating a method 1600 that supports techniques for transitioning from FD operation to HD operation in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include transmitting, to a network entity, first control signaling indicating a capability to operate in a FD mode. The operations of 1605 may be performed in accordance with examples as disclosed herein. In some examples, aspects of the operations of 1605 may be performed by a capability manager 1025 as described with reference to FIG. 10.

At 1610, the method may include receiving, from the network entity based on the first control signaling, second control signaling indicating a network entity mode and a UE mode for communication of one or more messages, where the network entity mode includes the FD mode or a HD mode and the UE mode includes the FD mode or the HD mode. The operations of 1610 may be performed in accordance with examples as disclosed herein. In some examples, aspects of the operations of 1610 may be performed by a mode manager 1030 as described with reference to FIG. 10.

At 1615, the method may include communicating the one or more messages based on the second control signaling indicating the network entity mode and the UE mode. The operations of 1615 may be performed in accordance with examples as disclosed herein. In some examples, aspects of the operations of 1615 may be performed by a message manager 1035 as described with reference to FIG. 10.

Figure 17:
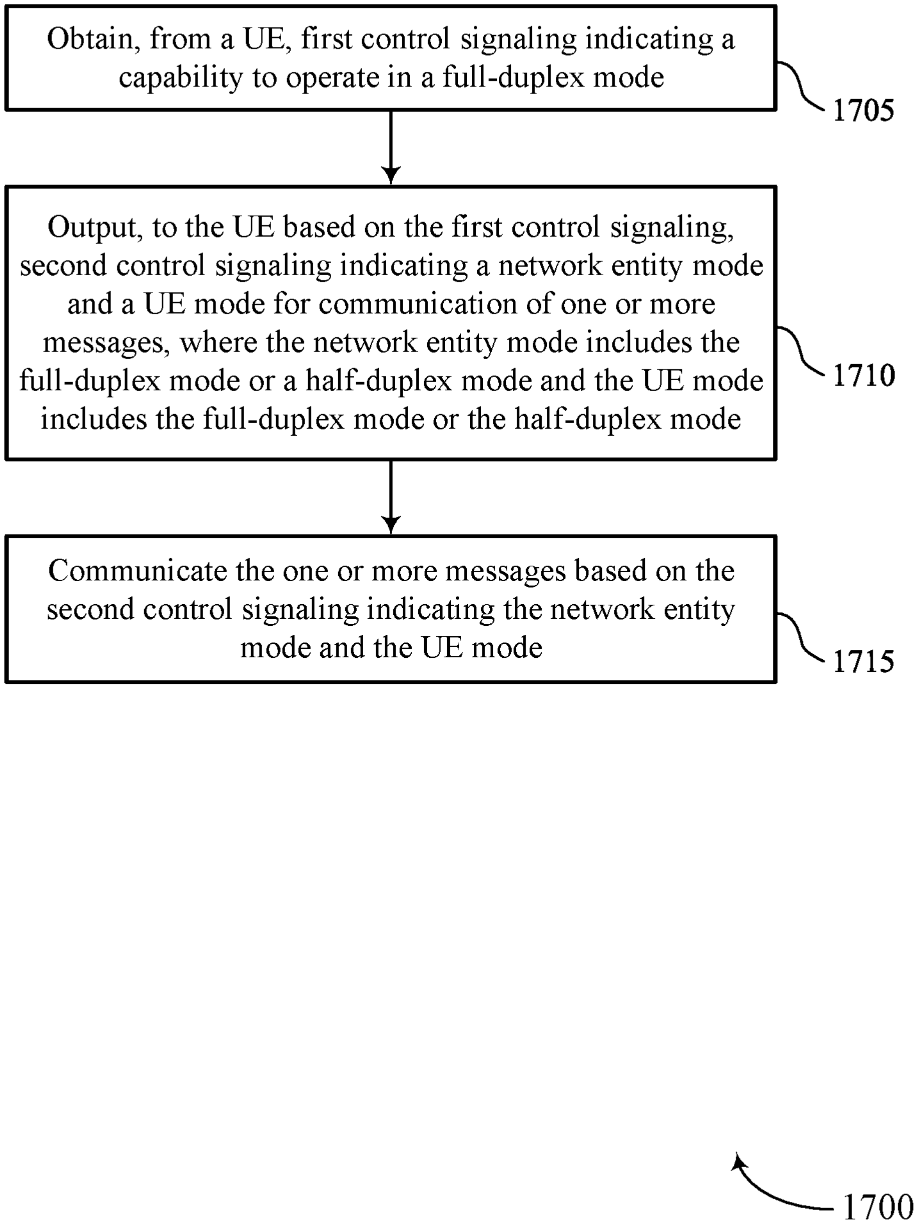

FIG. 17 shows a flowchart illustrating a method 1700 that supports techniques for transitioning from FD operation to HD operation in accordance with one or more aspects of the present disclosure. The operations of the method 1700 may be implemented by a network entity or its components as described herein. For example, the operations of the method 1700 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1705, the method may include obtaining, from a UE, first control signaling indicating a capability to operate in a FD mode. The operations of 1705 may be performed in accordance with examples as disclosed herein. In some examples, aspects of the operations of 1705 may be performed by a capability manager 1425 as described with reference to FIG. 14.

At 1710, the method may include outputting, to the UE based on the first control signaling, second control signaling indicating a network entity mode and a UE mode for communication of one or more messages, where the network entity mode includes the FD mode or a HD mode and the UE mode includes the FD mode or the HD mode. The operations of 1710 may be performed in accordance with examples as disclosed herein. In some examples, aspects of the operations of 1710 may be performed by a mode manager 1430 as described with reference to FIG. 14.

At 1715, the method may include communicating the one or more messages based on the second control signaling indicating the network entity mode and the UE mode. The operations of 1715 may be performed in accordance with examples as disclosed herein. In some examples, aspects of the operations of 1715 may be performed by a message manager 1435 as described with reference to FIG. 14.

Figure 18:
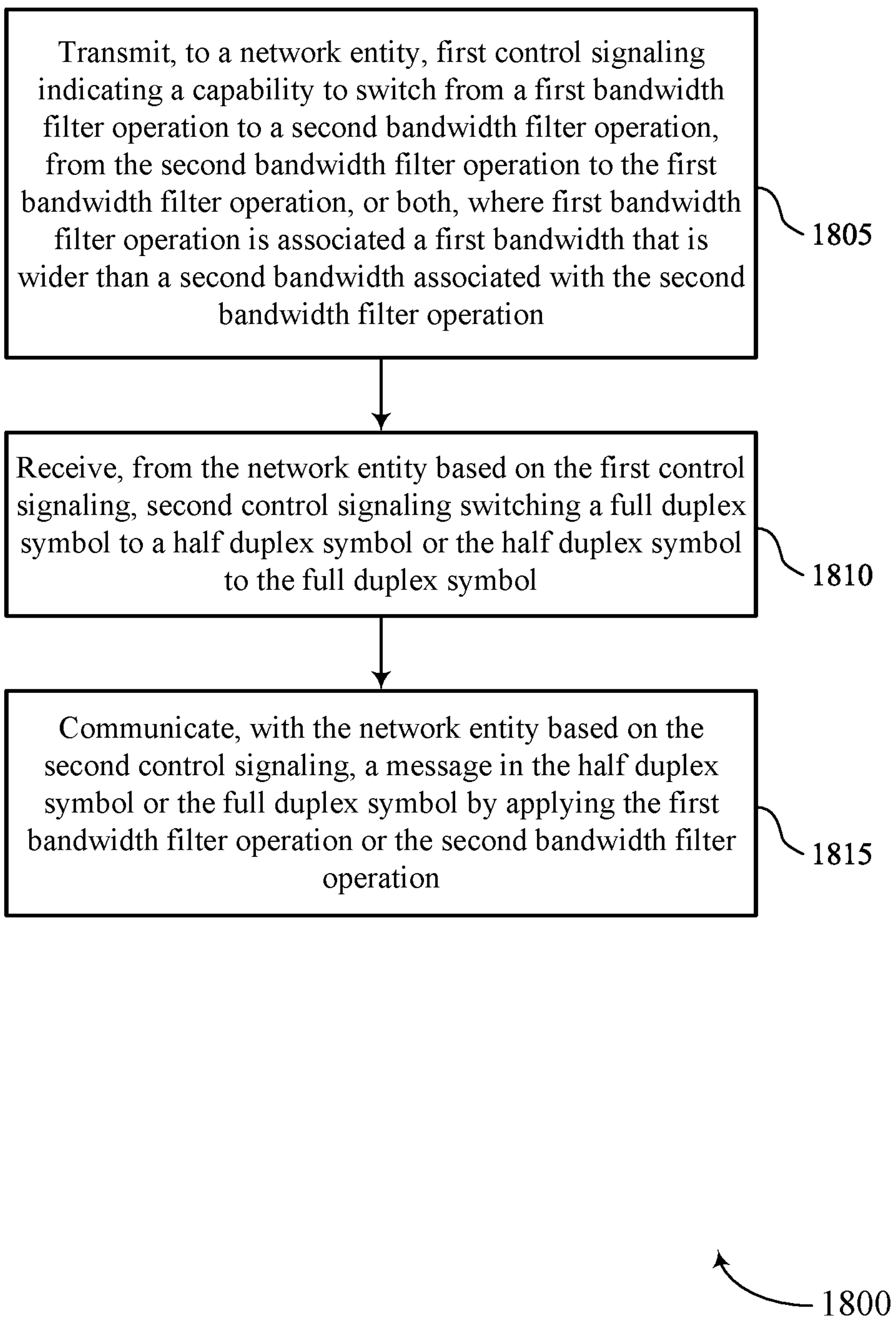

FIG. 18 shows a flowchart illustrating a method 1800 that supports techniques for transitioning from FD operation to HD operation in accordance with one or more aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include transmitting, to a network entity, first control signaling indicating a capability to switch from a first bandwidth filter operation to a second bandwidth filter operation, from the second bandwidth filter operation to the first bandwidth filter operation, or both, where first bandwidth filter operation is associated a first bandwidth that is wider than a second bandwidth associated with the second bandwidth filter operation. The operations of 1805 may be performed in accordance with examples as disclosed herein. In some examples, aspects of the operations of 1805 may be performed by a capability manager 1025 as described with reference to FIG. 10.

At 1810, the method may include receiving, from the network entity based on the first control signaling, second control signaling switching a FD symbol to a HD symbol or the HD symbol to the FD symbol. The operations of 1810 may be performed in accordance with examples as disclosed herein. In some examples, aspects of the operations of 1810 may be performed by a flexible symbol manager 1040 as described with reference to FIG. 10.

At 1815, the method may include communicating, with the network entity based on the second control signaling, a message in the HD symbol or the FD symbol by applying the first bandwidth filter operation or the second bandwidth filter operation. The operations of 1815 may be performed in accordance with examples as disclosed herein. In some examples, aspects of the operations of 1815 may be performed by a message manager 1035 as described with reference to FIG. 10.

Figure 19:
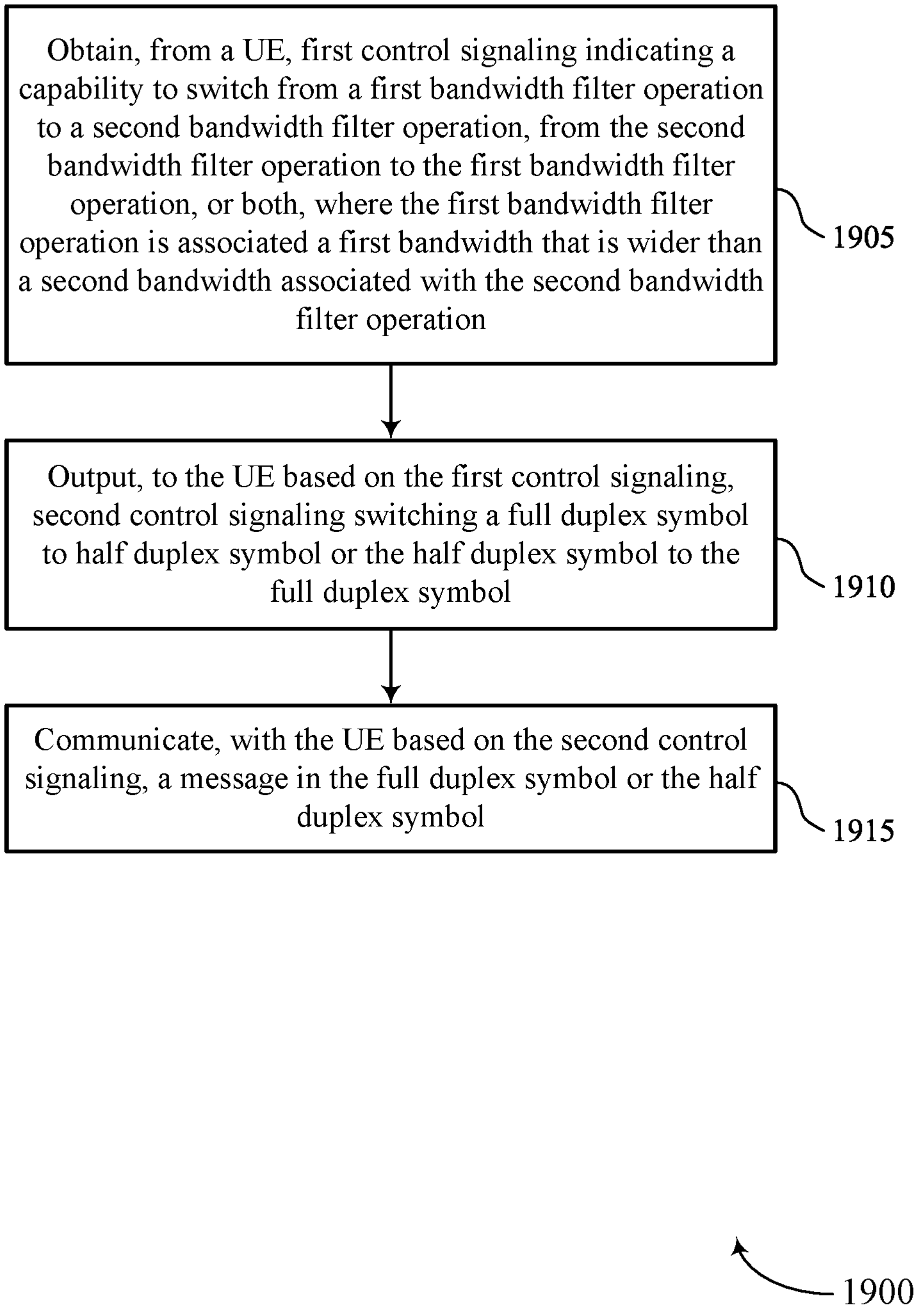

FIG. 19 shows a flowchart illustrating a method 1900 that supports techniques for transitioning from FD operation to HD operation in accordance with one or more aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include obtaining, from a UE, first control signaling indicating a capability to switch from a first bandwidth filter operation to a second bandwidth filter operation, from the second bandwidth filter operation to the first bandwidth filter operation, or both, where the first bandwidth filter operation is associated a first bandwidth that is wider than a second bandwidth associated with the second bandwidth filter operation. The operations of 1905 may be performed in accordance with examples as disclosed herein. In some examples, aspects of the operations of 1905 may be performed by a capability manager 1425 as described with reference to FIG. 14.

At 1910, the method may include outputting, to the UE based on the first control signaling, second control signaling switching a FD symbol to HD symbol or the HD symbol to the FD symbol. The operations of 1910 may be performed in accordance with examples as disclosed herein. In some examples, aspects of the operations of 1910 may be performed by a flexible symbol manager 1440 as described with reference to FIG. 14.

At 1915, the method may include communicating, with the UE based on the second control signaling, a message in the FD symbol or the HD symbol. The operations of 1915 may be performed in accordance with examples as disclosed herein. In some examples, aspects of the operations of 1915 may be performed by a message manager 1435 as described with reference to FIG. 14.

The following provides an overview of aspects of the present disclosure:

Aspect 1: A method for wireless communication by UE, comprising: transmitting, to a network entity, first control signaling indicating a capability to operate in a FD mode; receiving, from the network entity based at least in part on the first control signaling, second control signaling indicating a network entity mode and a UE mode for communication of one or more messages, wherein the network entity mode comprises the FD mode or a HD mode and the UE mode comprises the FD mode or the HD mode; and communicating the one or more messages based at least in part on the second control signaling indicating the network entity mode and the UE mode.

Aspect 2: The method of aspect 1, further comprising: receiving, from the network entity based at least in part on the second control signaling, third control signaling indicating a duration associated with the network entity mode, the UE mode, or both.

Aspect 3: The method of any of aspects 1 through 2, wherein the second control signaling indicates a change of the UE mode from the FD mode to the HD mode and the network entity mode is the FD mode, wherein communicating the one or more messages further comprises: communicating, based at least in part on a prioritized transmission direction, the one or more messages on an uplink channel or a downlink channel.

Aspect 4: The method of any of aspects 1 through 2, wherein the second control signaling indicates a change of the UE mode from the FD mode to the HD mode and the network entity mode is the FD mode, wherein communicating the one or more messages further comprises: communicating, based at least in part on prioritization of a channel type of a first channel or a reference signal type of the first channel, the one or more messages on the first channel or on a second channel.

Aspect 5: The method of any of aspects 1 through 2, wherein the second control signaling indicates a change of the UE mode from the FD mode to the HDD mode and the network entity mode is the FD mode, wherein communicating the one or more messages further comprises: receiving, from the network entity, fourth control signaling indicating a priority associated with a first channel; and communicating, based at least in part on the fourth control signaling, the one or more messages on the first channel or on a second channel.

Aspect 6: The method of any of aspects 1 through 2, further comprising: receiving fourth control signaling that indicates a change of the UE mode from the FD mode to the HD mode and the network entity mode is the FD mode; and refraining from communicating one or more second messages based at least in part on the fourth control signaling.

Aspect 7: The method of any of aspects 1 through 2, wherein the second control signaling indicates a change of the network entity mode from the FD mode to the HD mode, a change of the UE mode from the FD mode to the HD mode, and a change of a FD slot to an uplink slot, wherein the one or more messages comprises an uplink message and a downlink message, and wherein communicating the one or more messages further comprises: communicating the uplink message in the uplink slot; and refraining from communicating the downlink message in the uplink slot.

Aspect 8: The method of any of aspects 1 through 2, wherein the second control signaling indicates a change of the network entity mode from the FD mode to the HD mode, a change of the UE mode from the FD mode to the HD mode, and a change of a FD slot to a downlink slot, wherein the one or more messages comprises an uplink message and a downlink message and wherein communicating the one or more messages further comprises: communicating the downlink message in the downlink slot; and refraining from communicating the uplink message in the downlink slot.

Aspect 9: The method of any of aspects 1 through 2, wherein the second control signaling indicates a change of the UE mode from the FD mode to the HD mode, a change of the UE mode from the FD mode to the HD mode, and a change of a FD slot to a flexible slot, wherein the one or more messages comprise an uplink message and a downlink message, wherein communicating the one or more messages further comprises: communicating one of the uplink message or the downlink message in the flexible slot; and refraining from communicating another of the uplink message or the downlink message in the flexible slot.

Aspect 10: The method of any of aspects 1 through 9, wherein the second control signaling comprises two or more bits, the two or more bits indicate the network entity mode and the UE mode.

Aspect 11: The method of any of aspects 1 through 10, wherein the FD mode comprises a SBFD mode, a partially overlapping FD mode, or a fully overlapping FD mode.

Aspect 12: The method of any of aspects 1 through 11, wherein the second control signaling comprises downlink control information, group common downlink control information, radio resource control signaling, or a medium access control control element.

Aspect 13: A method for wireless communication by network entity, comprising: obtaining, from a UE, first control signaling indicating a capability to operate in a FD mode; outputting, to the UE based at least in part on the first control signaling, second control signaling indicating a network entity mode and a UE mode for communication of one or more messages, wherein the network entity mode comprises the FD mode or a HD mode and the UE mode comprises the FD mode or the HD mode; and communicating the one or more messages based at least in part on the second control signaling indicating the network entity mode and the UE mode.

Aspect 14: The method of aspect 13, further comprising: outputting, to the UE based at least in part on the second control signaling, third control signaling indicating a duration associated with the network entity mode, and the UE mode, or both.

Aspect 15: The method of any of aspects 13 through 14, wherein the second control signaling indicates a change of the UE mode from the FD mode to the HD mode and the network entity mode is the FD mode, wherein communicating the one or more messages further comprises: outputting, to the UE, fourth control signaling indicating a priority associated with a first channel; and communicating, based at least in part on the fourth control signaling, the one or more messages on the first channel or a second channel.

Aspect 16: The method of any of aspects 13 through 14, wherein the second control signaling indicates a change of the UE mode from the FD mode to the HD mode and the network entity mode is the FD mode, wherein communicating the one or more messages further comprises: outputting fourth control signaling that indicates a change of the UE mode from the FD mode to the HD mode; and refraining from communicating one or more second messages based at least in part on the fourth control signaling.

Aspect 17: The method of any of aspects 13 through 14, wherein the second control signaling indicates a change of the network entity mode from the FD mode to the HD mode, a change of the UE mode from the FD mode to the HD mode, and a change of a FD slot to an uplink slot, wherein the one or more messages comprises an uplink message and a downlink message, and wherein communicating the one or more messages further comprises: communicating the uplink message in the uplink slot; and refraining from communicating the downlink message in the uplink slot.

Aspect 18: The method of any of aspects 13 through 14, wherein the second control signaling indicates a change of the network entity mode from the FD mode to the HD mode, a change of the UE mode from the FD mode to the HD mode, and a change of a FD slot to a downlink slot, wherein the one or more messages comprises an uplink message and a downlink message, wherein communicating the one or more messages further comprises: communicating the downlink message in the downlink slot; and refraining from communicating the uplink message in the downlink slot.

Aspect 19: The method of any of aspects 13 through 14, wherein the second control signaling indicates a change of the UE mode from the FD mode to the HD mode, a change of the UE mode from the FD mode to the HD mode, and a change of a FD slot to a flexible slot, wherein the one or more messages comprise an uplink message and a downlink message, wherein communicating the one or more messages further comprises: communicating the uplink message in the flexible slot; and refraining from communicating another uplink message or the downlink message in the flexible slot.

Aspect 20: The method of any of aspects 13 through 19, wherein the second control signaling comprises two or more bits, the two or more bits indicate the network entity mode and the UE mode.

Aspect 21: A method for wireless communication by UE, comprising: transmitting, to a network entity, first control signaling indicating a capability to switch from a first bandwidth filter operation to a second bandwidth filter operation, from the second bandwidth filter operation to the first bandwidth filter operation, or both, wherein first bandwidth filter operation is associated a first bandwidth that is wider than a second bandwidth associated with the second bandwidth filter operation; receiving, from the network entity based at least in part on the first control signaling, second control signaling switching a FD symbol to a HD symbol or the HD symbol to the FD symbol; and communicating, with the network entity based at least in part on the second control signaling, a message in the HD symbol or the FD symbol by applying the first bandwidth filter operation or the second bandwidth filter operation.

Aspect 22: The method of aspect 21, wherein the first bandwidth filter operation comprises a wideband filter operation.

Aspect 23: The method of any of aspects 21 through 22, wherein the second bandwidth filter operation comprises a narrow band filter operation or a subband filter operation.

Aspect 24: The method of any of aspects 21 through 23, wherein the second control signaling indicates a change of the FD symbol to the HD symbol, wherein communicating the messages further comprises: communicating the message in the HD symbol by applying the first bandwidth filter operation.

Aspect 25: The method of any of aspects 21 through 24, wherein the FD symbol comprises a SBFD symbol configured on a flexible symbol or the SBFD symbol configured on a downlink symbol.

Aspect 26: The method of any of aspects 21 through 25, wherein the HD symbol comprises an uplink symbol or a downlink symbol.

Aspect 27: A method for wireless communication by network entity, comprising: obtaining, from a UE, first control signaling indicating a capability to switch from a first bandwidth filter operation to a second bandwidth filter operation, from the second bandwidth filter operation to the first bandwidth filter operation, or both, wherein the first bandwidth filter operation is associated a first bandwidth that is wider than a second bandwidth associated with the second bandwidth filter operation; outputting, to the UE based at least in part on the first control signaling, second control signaling switching a FD symbol to HD symbol or the HD symbol to the FD symbol; and communicating, with the UE based at least in part on the second control signaling, a message in the FD symbol or the HD symbol.

Aspect 28: The method of aspect 27, wherein the first bandwidth filter operation comprises a wideband filter operation and the second bandwidth filter operation comprises a narrow band filter operation or a subband filter operation.

Aspect 29: The method of any of aspects 27 through 28, wherein the second control signaling indicates a change of the FD symbol to the HD symbol, wherein communicating the message further comprises: communicating the message in the HD symbol by applying the first bandwidth filter operation.

Aspect 30: The method of any of aspects 27 through 29, wherein the FD symbol comprises a SBFD symbol configured on a flexible symbol or the SBFD symbol configured on a downlink symbol and the HD symbol comprises an uplink symbol or a downlink symbol.

Aspect 31: A UE for wireless communication, comprising one or more memories storing processor-executable code, and one or more processors coupled with the one or more memories and individually or collectively operable to execute the code to cause the UE to perform a method of any of aspects 1 through 12.

Aspect 32: A UE for wireless communication, comprising at least one means for performing a method of any of aspects 1 through 12.

Aspect 33: A non-transitory computer-readable medium storing code for wireless communication, the code comprising instructions executable by one or more processors to perform a method of any of aspects 1 through 12.

Aspect 34: A network entity for wireless communication, comprising one or more memories storing processor-executable code, and one or more processors coupled with the one or more memories and individually or collectively operable to execute the code to cause the network entity to perform a method of any of aspects 13 through 20.

Aspect 35: A network entity for wireless communication, comprising at least one means for performing a method of any of aspects 13 through 20.

Aspect 36: A non-transitory computer-readable medium storing code for wireless communication, the code comprising instructions executable by one or more processors to perform a method of any of aspects 13 through 20.

Aspect 37: A UE for wireless communication, comprising one or more memories storing processor-executable code, and one or more processors coupled with the one or more memories and individually or collectively operable to execute the code to cause the UE to perform a method of any of aspects 21 through 26.

Aspect 38: A UE for wireless communication, comprising at least one means for performing a method of any of aspects 21 through 26.

Aspect 39: A non-transitory computer-readable medium storing code for wireless communication, the code comprising instructions executable by one or more processors to perform a method of any of aspects 21 through 26.

Aspect 40: A network entity for wireless communication, comprising one or more memories storing processor-executable code, and one or more processors coupled with the one or more memories and individually or collectively operable to execute the code to cause the network entity to perform a method of any of aspects 27 through 30.

Aspect 41: A network entity for wireless communication, comprising at least one means for performing a method of any of aspects 27 through 30.

Aspect 42: A non-transitory computer-readable medium storing code for wireless communication, the code comprising instructions executable by one or more processors to perform a method of any of aspects 27 through 30.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
- one or more memories storing processor-executable code; and
- one or more processors coupled with the one or more memories and individually or collectively operable to execute the code to cause the UE to:
  - transmit, to a network entity, first control signaling indicating a capability to operate in a full-duplex mode;
  - receive, from the network entity based at least in part on the first control signaling, second control signaling indicating a network entity mode and a UE mode for communication of one or more messages, wherein the network entity mode comprises the full-duplex mode or a half-duplex mode and the UE mode comprises the full-duplex mode or the half-duplex mode; and
  - communicate the one or more messages based at least in part on the second control signaling indicating the network entity mode and the UE mode.

2. The UE of claim 1, wherein the one or more processors are individually or collectively further operable to execute the code to cause the UE to:
- receive, from the network entity based at least in part on the second control signaling, third control signaling indicating a duration associated with the network entity mode, the UE mode, or both.

3. The UE of claim 1, wherein the second control signaling indicates a change of the UE mode from the full-duplex mode to the half-duplex mode and the network entity mode is the full-duplex mode, wherein, to communicate the one or more messages, the one or more processors are individually or collectively further operable to execute the code to cause the UE to:

communicate, based at least in part on a prioritized transmission direction, the one or more messages on an uplink channel or a downlink channel.

4. The UE of claim 1, wherein the second control signaling indicates a change of the UE mode from the full-duplex mode to the half-duplex mode and the network entity mode is the full-duplex mode, wherein, to communicate the one or more messages, the one or more processors are individually or collectively further operable to execute the code to cause the UE to:

communicate, based at least in part on prioritization of a channel type of a first channel or a reference signal type of the first channel, the one or more messages on the first channel or on a second channel.

5. The UE of claim 1, wherein the second control signaling indicates a change of the UE mode from the full-duplex mode to the half-duplex mode and the network entity mode is the full-duplex mode, wherein, to communicate the one or more messages, the one or more processors are individually or collectively further operable to execute the code to cause the UE to:

receive, from the network entity, fourth control signaling indicating a priority associated with a first channel; and communicate, based at least in part on the fourth control signaling, the one or more messages on the first channel or on a second channel.

6. The UE of claim 1, wherein the one or more processors are individually or collectively further operable to execute the code to cause the UE to:

receive fourth control signaling that indicates a change of the UE mode from the full-duplex mode to the half-duplex mode and the network entity mode is the full-duplex mode; and refrain from communicating one or more second messages based at least in part on the fourth control signaling.

7. The UE of claim 1, wherein the second control signaling indicates a change of the network entity mode from the full-duplex mode to the half-duplex mode, a change of the UE mode from the full-duplex mode to the half-duplex mode, and a change of a full duplex slot to an uplink slot, wherein the one or more messages comprises an uplink message and a downlink message, and wherein, to communicate the one or more messages, the one or more processors are individually or collectively further operable to execute the code to cause the UE to:

communicate the uplink message in the uplink slot; and refrain from communicating the downlink message in the uplink slot.

8. The UE of claim 1, wherein the second control signaling indicates a change of the network entity mode from the full-duplex mode to the half-duplex mode, a change of the UE mode from the full-duplex mode to the half-duplex mode, and a change of a full duplex slot to a downlink slot, wherein the one or more messages comprises an uplink message and a downlink message, wherein, to communicate the one or more messages, the one or more processors are individually or collectively further operable to execute the code to cause the UE to:

communicate the downlink message in the downlink slot; and refrain from communicating the uplink message in the downlink slot.

9. The UE of claim 1, wherein the second control signaling indicates a change of the UE mode from the full-duplex mode to the half-duplex mode, a change of the UE mode from the full-duplex mode to the half-duplex mode, and a change of a full duplex slot to a flexible slot, wherein the one or more messages comprises an uplink message and a downlink message, and wherein, to communicate the one or more messages, the one or more processors are individually or collectively further operable to execute the code to cause the UE to:

communicate one of the uplink message or the downlink message in the flexible slot; and refrain from communicating another of the uplink message or the downlink message in the flexible slot.

10. The UE of claim 1, wherein the second control signaling comprises two or more bits, and the two or more bits indicate the network entity mode and the UE mode.

11. The UE of claim 1, wherein the full-duplex mode comprises a subband full-duplex mode, a partially overlapping full-duplex mode, or a fully overlapping full-duplex mode.

12. The UE of claim 1, wherein the second control signaling comprises downlink control information, group common downlink control information, radio resource control signaling, or a medium access control control element.

13. A network entity, comprising:

one or more memories storing processor-executable code; and one or more processors coupled with the one or more memories and individually or collectively operable to execute the code to cause the network entity to:

obtain, from a user equipment (UE), first control signaling indicating a capability to operate in a full-duplex mode;

output, to the UE based at least in part on the first control signaling, second control signaling indicating a network entity mode and a UE mode for communication of one or more messages, wherein the network entity mode comprises the full-duplex mode or a half-duplex mode and the UE mode comprises the full-duplex mode or the half-duplex mode; and communicate the one or more messages based at least in part on the second control signaling indicating the network entity mode and the UE mode.

14. The network entity of claim 13, wherein the one or more processors are individually or collectively further operable to execute the code to cause the network entity to:

output, to the UE based at least in part on the second control signaling, third control signaling indicating a duration associated with the network entity mode, and the UE mode, or both.

15. The network entity of claim 13, wherein the second control signaling indicates a change of the UE mode from the full-duplex mode to the half-duplex mode and the network entity mode is the full-duplex mode, wherein, to communicate the one or more messages, the one or more processors are individually or collectively further operable to execute the code to cause the network entity to:

output, to the UE, fourth control signaling indicating a priority associated with a first channel; and communicate, based at least in part on the fourth control signaling, the one or more messages on the first channel or a second channel.

16. The network entity of claim 13, wherein the second control signaling indicates a change of the UE mode from the full-duplex mode to the half-duplex mode and the network entity mode is the full-duplex mode, wherein, to communicate the one or more messages, the one or more processors are individually or collectively further operable to execute the code to cause the network entity to:

output fourth control signaling that indicates a change of the UE mode from the full-duplex mode to the half-duplex mode; and refrain from communicating one or more second messages based at least in part on the fourth control signaling.

17. The network entity of claim 13, wherein the second control signaling indicates a change of the network entity mode from the full-duplex mode to the half-duplex mode, a change of the UE mode from the full-duplex mode to the half-duplex mode, and a change of a full duplex slot to an uplink slot, wherein the one or more messages comprises an uplink message and a downlink message, and wherein, to communicate the one or more messages, the one or more processors are individually or collectively further operable to execute the code to cause the network entity to:

communicate the uplink message in the uplink slot; and refrain from communicating the downlink message in the uplink slot.

18. The network entity of claim 13, wherein the second control signaling indicates a change of the network entity mode from the full-duplex mode to the half-duplex mode, a change of the UE mode from the full-duplex mode to the half-duplex mode, and a change of a full duplex slot to a downlink slot, wherein the one or more messages comprises an uplink message and a downlink message, and wherein, to communicate the one or more messages, the one or more processors are individually or collectively further operable to execute the code to cause the network entity to:

communicate the downlink message in the downlink slot; and refrain from communicating the uplink message in the downlink slot.

19. The network entity of claim 13, wherein the second control signaling indicates a change of the UE mode from the full-duplex mode to the half-duplex mode, a change of the UE mode from the full-duplex mode to the half-duplex mode, and a change of a full duplex slot to a flexible slot, wherein the one or more messages comprise an uplink message and a downlink message, and wherein, to communicate the one or more messages, the one or more processors are individually or collectively further operable to execute the code to cause the network entity to:

communicate the uplink message in the flexible slot; and refrain from communicating another uplink message or the downlink message in the flexible slot.

20. The network entity of claim 13, wherein the second control signaling comprises two or more bits, and the two or more bits indicate the network entity mode and the UE mode.

21. A user equipment (UE), comprising:

one or more memories storing processor-executable code; and one or more processors coupled with the one or more memories and individually or collectively operable to execute the code to cause the UE to:

transmit, to a network entity, first control signaling indicating a capability to switch from a first bandwidth filter operation to a second bandwidth filter operation, from the second bandwidth filter operation to the first bandwidth filter operation, or both, wherein first bandwidth filter operation is associated a first bandwidth that is wider than a second bandwidth associated with the second bandwidth filter operation;

receive, from the network entity based at least in part on the first control signaling, second control signaling switching a full duplex symbol to a half duplex symbol or the half duplex symbol to the full duplex symbol; and communicate, with the network entity based at least in part on the second control signaling, a message in the half duplex symbol or the full duplex symbol by applying the first bandwidth filter operation or the second bandwidth filter operation.

22. The UE of claim 21, wherein the first bandwidth filter operation comprises a wideband filter operation, and wherein the second bandwidth filter operation comprises a narrow band filter operation or a subband filter operation.

23. The UE of claim 21, wherein the second control signaling indicates a change of the full duplex symbol to the half duplex symbol, wherein, to communicate the message, the one or more processors are individually or collectively further operable to execute the code to cause the UE to:

communicate the message in the half duplex symbol by applying the first bandwidth filter operation.

24. The UE of claim 21, wherein the full duplex symbol comprises a subband full duplex symbol configured on a flexible symbol or the subband full duplex symbol configured on a downlink symbol.

25. The UE of claim 21, wherein the half duplex symbol comprises an uplink symbol or a downlink symbol.

26. A network entity, comprising:

one or more memories storing processor-executable code; and one or more processors coupled with the one or more memories and individually or collectively operable to execute the code to cause the network entity to:

obtain, from a user equipment (UE), first control signaling indicating a capability to switch from a first bandwidth filter operation to a second bandwidth filter operation, from the second bandwidth filter operation to the first bandwidth filter operation, or both, wherein the first bandwidth filter operation is associated a first bandwidth that is wider than a second bandwidth associated with the second bandwidth filter operation;

output, to the UE based at least in part on the first control signaling, second control signaling switching a full duplex symbol to half duplex symbol or the half duplex symbol to the full duplex symbol; and communicate, with the UE based at least in part on the second control signaling, a message in the full duplex symbol or the half duplex symbol.

27. The network entity of claim 26, wherein the first bandwidth filter operation comprises a wideband filter operation and the second bandwidth filter operation comprises a narrow band filter operation or a subband filter operation.

28. The network entity of claim 26, wherein the second control signaling indicates a change of the full duplex symbol to the half duplex symbol, wherein, to communicate the message, the one or more processors are individually or collectively further operable to execute the code to cause the network entity to:

communicate the message in the half duplex symbol by applying the first bandwidth filter operation.

29. The network entity of claim 26, wherein the full duplex symbol comprises a subband full duplex symbol configured on a flexible symbol or the subband full duplex symbol configured on a downlink symbol and the half duplex symbol comprises an uplink symbol or a downlink symbol.

30. The UE of claim 1, wherein the network entity mode indicated by the second control signaling is individually configurable separately from the UE mode indicated by the second control signaling.

* * * * *